US012481495B2

(12) United States Patent
Lim et al.

(10) Patent No.: US 12,481,495 B2
(45) Date of Patent: Nov. 25, 2025

(54) FIRMWARE UPDATE METHOD OF A FLASH BOOTLOADER IN A MICRO CONTROLLER UNIT FOR A VEHICLE

(71) Applicant: HYUNDAI AUTOEVER CORP., Seoul (KR)

(72) Inventors: JaeHyun Lim, Seoul (KR); YoungJin Yun, Seoul (KR); YongSeong Jeon, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 363 days.

(21) Appl. No.: 18/085,084

(22) Filed: Dec. 20, 2022

(65) Prior Publication Data

US 2023/0418591 A1 Dec. 28, 2023

(30) Foreign Application Priority Data

Jun. 24, 2022 (KR) .......................... 10-2022-0077590

(51) Int. Cl.
*G06F 9/44* (2018.01)
*G06F 8/654* (2018.01)
*G06F 9/4401* (2018.01)

(52) U.S. Cl.
CPC ............ *G06F 8/654* (2018.02); *G06F 9/4401* (2013.01)

(58) Field of Classification Search
CPC ............................... G06F 8/654; G06F 9/4401
See application file for complete search history.

(56) References Cited

U.S. PATENT DOCUMENTS

| 7,818,740 | B2 | 10/2010 | Bankston |
| 8,370,828 | B2 | 2/2013 | Bankston |
| 9,678,742 | B2 | 6/2017 | Kanematsu |
| 10,558,453 | B1 * | 2/2020 | Bhaskar .................. G06F 8/65 |
| 11,036,421 | B2 * | 6/2021 | Park .................. G06F 11/3698 |

(Continued)

FOREIGN PATENT DOCUMENTS

| JP | 2015001814 A | 1/2015 |
| KR | 20070083138 A | 8/2007 |

(Continued)

OTHER PUBLICATIONS

Office Action cited in corresponding patent application No. KR 10-2022-0077590; May 20, 2024; 12 pp.

*Primary Examiner* — Qamrun Nahar
(74) *Attorney, Agent, or Firm* — Lempia Summerfield Katz LLC

(57) ABSTRACT

A method of updating firmware by a flash bootloader includes: storing current version information included in a trailer block of firmware stored in a flash memory, the firmware including the trailer block and a header block; erasing a sector in which the header block is located while maintaining a sector in which the trailer block is located in the flash memory; writing a header block of a new firmware to be downloaded in the flash memory; determining, by comparing current version information of the new firmware in the written header block and the stored current version information, whether the firmware is to be downgraded; and, in response to determining that the firmware is not to be downgraded, erasing a sector in which the trailer block is located from the flash memory, and writing a trailer block of the new firmware in the flash memory.

12 Claims, 32 Drawing Sheets

(56) References Cited

U.S. PATENT DOCUMENTS

| | | |
|---|---|---|
| 11,537,389 B2 * | 12/2022 | Rosner .................... G06F 8/654 |
| 11,755,315 B2 | 9/2023 | Hong |
| 2007/0261049 A1 | 11/2007 | Bankston |
| 2008/0104398 A1 | 5/2008 | Cho et al. |
| 2011/0016461 A1 | 1/2011 | Bankston |
| 2014/0373000 A1 | 12/2014 | Kanematsu |
| 2020/0183677 A1 * | 6/2020 | Hong ........................ G06F 8/66 |
| 2020/0226026 A1 * | 7/2020 | Wu ....................... G06F 11/362 |
| 2022/0027138 A1 * | 1/2022 | Stevens .................... G06F 8/65 |

FOREIGN PATENT DOCUMENTS

| | | |
|---|---|---|
| KR | 100780362 B1 | 11/2007 |
| KR | 20090031669 A | 3/2009 |
| KR | 101425224 B1 | 7/2014 |
| KR | 20200068345 A | 6/2020 |

* cited by examiner

DOWNLOADED FIRMWARE

| HEADER (10D) | CURRENT VERSION | 3 |
|---|---|---|
| | | |
| | | |

| TRAILER (20D) | CURRENT VERSION | 3 |
|---|---|---|
| | | |
| | | |

FIRMWARE STORED IN FLASH MEMORY 120

| HEADER (10F) | CURRENT VERSION | |
|---|---|---|
| | PREVIOUS VERSION | |
| | CRC | |

| TRAILER (20F) | CURRENT VERSION | 2 |
|---|---|---|
| | PREVIOUS VERSION | 1 |
| | CRC | XX XX XX XX |

VERSION INFORMATION STORED IN RAM

130

VERSION INFORMATION STORED IN RAM

130

VERSION INFORMATION STORED IN RAM

FIRMWARE UPDATE METHOD OF A FLASH BOOTLOADER IN A MICRO CONTROLLER UNIT FOR A VEHICLE

CROSS-REFERENCE TO RELATED APPLICATIONS

This application claims priority to and the benefit of Korean Patent Application No. 10-2022-0077590 filed on Jun. 24, 2022, the entire contents of which are incorporated herein by reference.

FIELD

The present disclosure relates to a firmware update method of a flash bootloader in a micro controller unit (MCU) for a vehicle.

BACKGROUND

Currently, various electronic devices may be provided in a vehicle for the convenience of a user. A micro controller unit (MCU) may be mounted in a vehicle controller to control the various electronic devices. There is an update (also referred to as "reprogramming") technology for updating firmware of the MCU. Recently, firmware downgrade attacks, in which attackers attempt to update firmware to a version lower than the current firmware version, have occurred.

Typically, firmware of the MCU is stored in a flash memory and firmware is updated by a flash bootloader. Due to the characteristic of the flash memory, the flash bootloader needs to download the firmware in case flash erasing has occurred. Version information of the firmware is located in the firmware so that the version information can be identified only after downloading the firmware from a diagnostic device to the MCU. Accordingly, the version of the firmware which is stored in the current flash memory is typically read out and stored in the volatile memory (e.g., random-access memory (RAM)) as a current version, and the current version and a new version of the downloaded firmware are compared to determine whether the version is downgraded.

The foregoing is intended merely to aid in the understanding of the background of the present disclosure, and is not intended to mean that the present disclosure falls within the purview of the related art that is already known to those having ordinary skill in the art.

SUMMARY

When data stored in the RAM is erased due to a "battery off" situation unintentionally generated during a firmware update process, current version information of the firmware is lost so that it is difficult to determine whether the version is downgraded.

For example, when the "battery off" situation occurs before the firmware is downloaded after flash-erase, the version information does not remain in either the flash memory or the RAM.

As another example, even when the firmware is downloaded after flash-erase, it may be determined that the version of the firmware is downgraded. Thus, the wrong firmware is downloaded and the version of the firmware currently stored in the flash memory is not reliable. In this case, a previous version of the firmware before the new firmware is downloaded needs to be recognized as the current version when a next firmware update is performed. However, there is no way to recognize the previous version of the firmware before the new firmware is downloaded as the current version for the next firmware update.

As yet another example, even when the firmware is downloaded after flash-erase and it is confirmed that the version is not downgraded, the "battery off" situation may occur before firmware integrity verification (e.g., signature verification) is performed. The version information in the firmware in which the integrity is not verified is not reliable. In this case, again, a previous version of the firmware before the new firmware is downloaded needs to be recognized as the current version when a next firmware is performed. However, there is no way to recognize the previous version of the firmware before the new firmware is downloaded as the current version for the next firmware update.

Embodiments of the present disclosure provide a firmware update method which prevents a firmware downgrade attack by accurately recognizing the current version of the firmware even when an unintended "battery off" situation occurs during the firmware update process.

The technical object to be achieved by the present disclosure is not limited to the above-mentioned technical objects, and other technical objects, which are not mentioned above, can be clearly understood by those skilled in the art from the following descriptions.

According to an embodiment of the present disclosure, a method for update of firmware by a flash bootloader includes: storing current version information included in a trailer block of firmware stored in a flash memory, wherein the firmware includes the trailer block and a header block; erasing a sector in which the header block is located while maintaining a sector in which the trailer block is located in the flash memory; writing a header block of a new firmware to be downloaded in the flash memory; determining, by comparing current version information of the new firmware included in the written header block and the stored current version information, whether the firmware is to be downgraded; and, in response to determining that the firmware is not to be downgraded, erasing a sector in which the trailer block is located from the flash memory, and writing a trailer block of the new firmware in the flash memory.

According to an aspect, the method further includes, in response to determining that the firmware is not to be downgraded, adding the stored current version information in the written header block as previous version information.

According to an aspect, the method further includes adding a cyclic redundancy check (CRC) to the written header block, wherein the CRC is generated based on the current version information and the previous version information in the written header block.

According to an aspect, the method further includes verifying an integrity of the new firmware, and adding the stored current version information in the written trailer block as previous version information if the integrity is verified.

According to an aspect, the method further includes adding a cyclic redundancy check (CRC) value to the written trailer block, wherein the CRC value is generated based on current version information and the previous version information of in the written trailer block.

According to an aspect, the method further includes erasing a sector in which the trailer block is located from the flash memory if the integrity is not verified, restoring a trailer block with previous version information of a header block stored in the flash memory as current version information, and erasing the sector in which the header block is located while maintaining a sector in which the trailer block is located in the flash memory.

According to an aspect, the method further includes, in response to determining that the firmware is to be downgraded, maintaining the sector in which the trailer block is located in the flash memory and erasing the sector in which the header block is located in the flash memory According to an aspect, the method further includes confirming a validity of the header block of the firmware stored in the flash memory, and confirming a validity of the trailer block of the firmware stored in the flash memory.

According to an aspect, confirming the validity of the header block is performed using i) current version information and previous version information included in the header block and ii) a cyclic redundancy check (CRC) generated based on the current version information and the previous version information included in the header block, and confirming the validity of the trailer block is performed using i) current version information and previous version information included in the trailer block and ii) a cyclic redundancy check (CRC) generated based on the current version information and the previous version information included in the trailer block.

According to an aspect, the method further includes if i) it is confirmed that the header block is valid and ii) it is confirmed that the trailer block is not valid: erasing the sector in which the trailer block is located from the flash memory before storing the current version information included in the trailer block of the firmware stored in the flash memory, and restoring the trailer block with previous version information of the header block stored in the flash memory as current version information.

According to an aspect, storing the current version information included in the trailer block of the firmware stored in a flash memory comprises storing the current version information in random-access memory (RAM).

According to an aspect, the header block and the trailer block are configured to be located in different sectors of the flash memory.

According to and embodiment of the present disclosure, even when an unintended "battery off" situation occurs during a firmware update process, the current version of the firmware is correctly recognized to prevent a firmware downgrade attack.

Effects of the present disclosure are not limited to the above-mentioned effects, and other effects, which are not mentioned above, can be clearly understood by those skilled in the art from the following descriptions.

The foregoing summary is illustrative only and is not intended to be in any way limiting. In addition to the illustrative aspects, embodiments, and features described above, further aspects, embodiments, and features can become apparent by reference to the drawings and the following detailed description.

BRIEF DESCRIPTION OF THE DRAWINGS

In order that the disclosure may be well understood, there are now described various forms thereof, given by way of example, reference being made to the accompanying drawings, in which.

Figure 1:
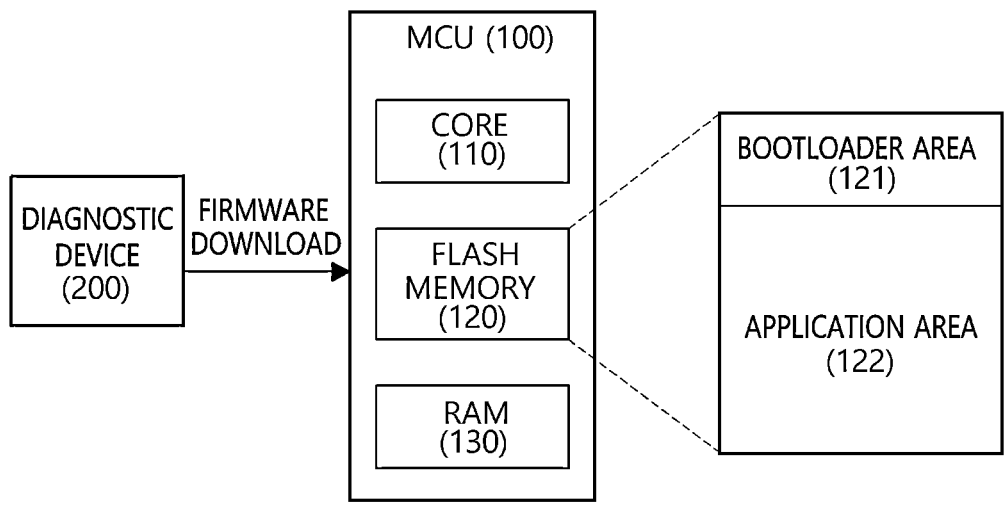
FIG. 1 is a block diagram illustrating a schematic structure of an MCU for a vehicle according to an embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION

Hereinafter, example embodiments of the present disclosure are described in detail with reference to the accompanying drawings. Substantially same components in the following description and the accompanying drawings may be denoted by the same reference numerals and redundant descriptions thereof may be omitted. Further, if it is considered that a specific description of related known configuration or function may cloud the gist of the present disclosure, the detailed description thereof is omitted.

Throughout the specification, when a certain part "includes" or "comprises" a certain component, this indicates that other components are not excluded, and may be further included unless otherwise noted. The same reference numerals used throughout the specification refer to the same constituent elements.

When a component, device, element, or the like of the present disclosure is described as having a purpose or performing an operation, function, or the like, the component, device, or element should be considered herein as being "configured to" meet that purpose or to perform that operation or function.

As publicly known in the art, some of exemplary forms may be illustrated in the accompanying drawings from the viewpoint of function blocks, units and/or modules. Those having ordinary skill in the art should understand that such blocks, units and/or modules are physically implemented by electronic (or optical) circuits such as logic circuits, discrete components, hard wired circuits, processors, memory devices and wiring connections. When the blocks, units and or modules are implemented by processors or other similar hardware, the blocks, units and modules may be programmed and controlled through software (for example, codes) in order to perform various functions discussed in the present disclosure. Furthermore, each of the blocks, units and/or modules may be implemented by dedicated hardware or a combination of dedicated hardware for performing some functions and a processor for performing another function (for example, one or more programmed processors and related circuits).

FIG. 1 is a block diagram illustrating a schematic structure of an MCU for a vehicle according to an embodiment of the present disclosure.

With reference to FIG. 1, an MCU 100 may be configured to download firmware from a diagnostic device 200 (for example, on board diagnostics). According to an embodiment, the MCU 100 may download the firmware by means of a vehicle gateway (not illustrated).

The MCU 100 may include a core 110, a flash memory 120, and a random access memory (RAM) 130. The core 110 may be configured to execute computer-readable instruction (e.g., of a program) stored in the flash memory 120. The RAM 130 may be configured to temporarily store data during execution of the computer-readable instructions by the core 110. The flash memory 120 may include a bootloader area 121 and an application area 122. A flash bootloader may be stored in the bootloader area 121. The firmware may be stored in the application area 122. The flash bootloader stored in the bootloader area 121 may be configured to update firmware stored in the application area 122.

Figure 2:
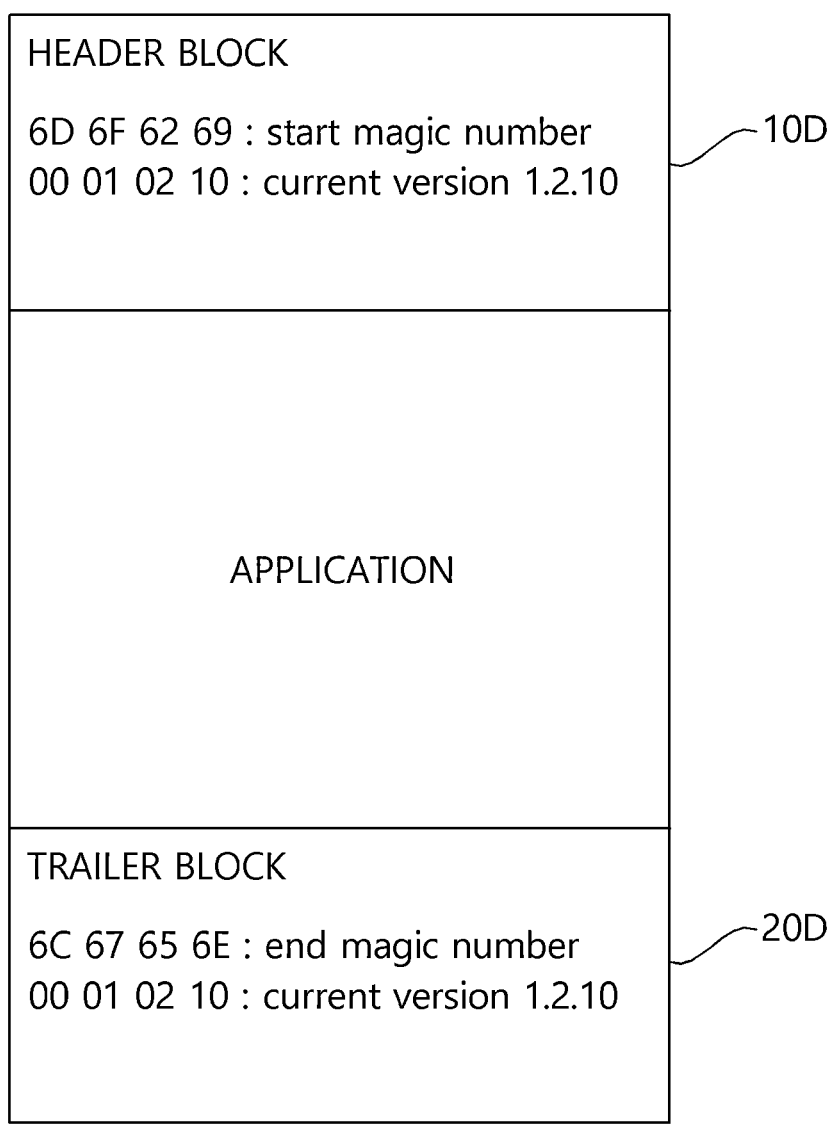
FIG. 2 illustrates a structure of a firmware to be downloaded according to an embodiment of the present disclosure.

FIG. 2 is a diagram illustrating structure of firmware that may be downloaded from the diagnostic device 200, according to an embodiment of the present disclosure.

The firmware may include a header block 10D and a trailer block 20D in front and back thereof. The header block 10D may comprise a designated fixed value and may include a start magic number representing the beginning of the header block 10D and current version information of the corresponding firmware. Similarly, the trailer block 20D may comprise a designated fixed value and may include an end magic number representing the beginning of the trailer block 20D and current version information of the corresponding firmware. In an aspect, the header block 10D and the trailer block 20D may be configured to be located in different sectors of the flash memory when the header block and the trailer block are written in the flash memory.

Figure 3:
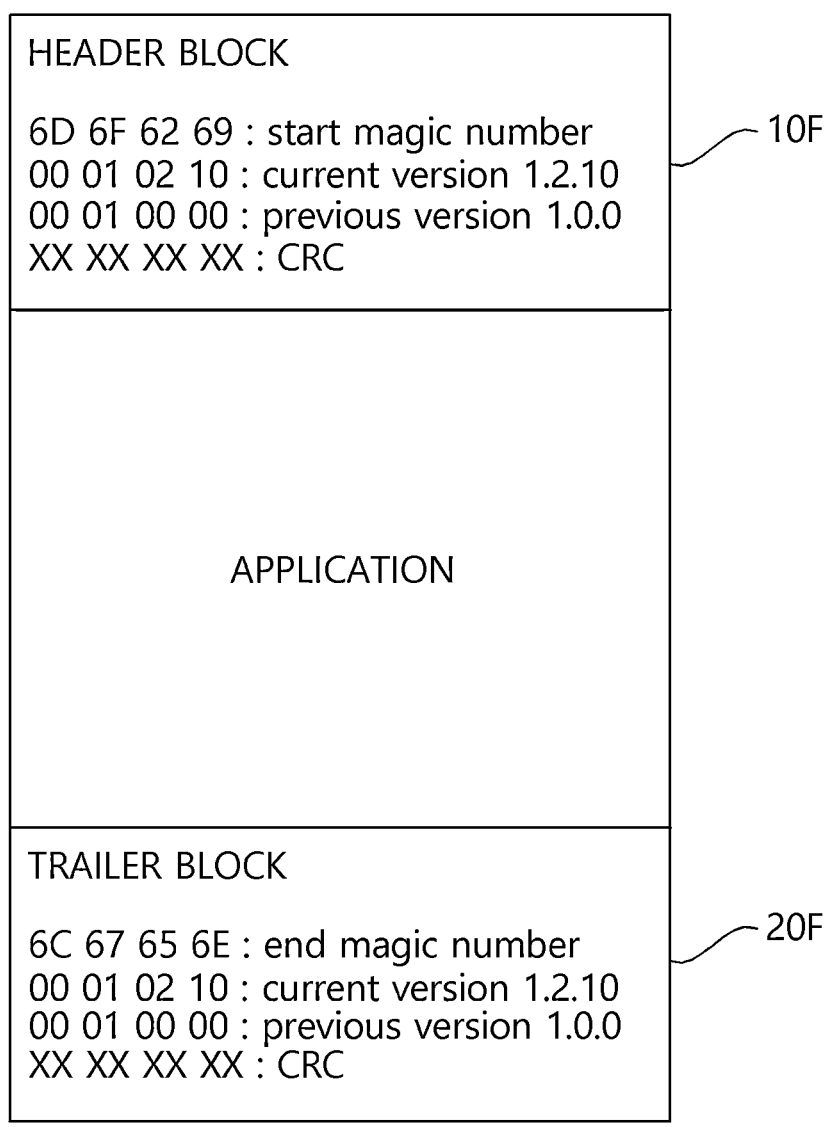
FIG. 3 illustrates a structure of a firmware which is normally reprogrammed in a flash memory, according to an embodiment of the present disclosure.

FIG. 3 is a diagram illustrating structure of firmware that may be stored in the flash memory 120, according to an embodiment of the present disclosure. FIG. 3 illustrates a case when the firmware illustrated in FIG. 2 is normally reprogrammed in the flash memory 120, according to an embodiment of the present disclosure. Referring to FIG. 3, a header block 10F incudes previous version information and a cyclic redundancy check (CRC) in addition to the start magic number and current version information. Similarly, a trailer block 20F includes previous version information and CRC in addition to the end magic number and current version information. The CRC of the header block may comprise a CRC value generated based on the start magic number, the current version information and the previous version information of the header block 10F. The CRC of the trailer block 20F may comprise a CRC value generated based on the end magic number, the current version information, and the previous version information of the trailer block 20F. The validity of the header block 10F may be confirmed based on the start magic number, the current version information, the previous version information, and the CRC of the header block 10F. For example, when the start magic number is a designated normal value and the CRC value generated or otherwise obtained based on the start magic number, the current version information, and the previous version information of the header block 10F matches the CRC value of the header block 10F, it may be confirmed that the header block 10F is valid. Similarly, the validity of the trailer block may be confirmed based on the end magic number, the current version information, the previous version information, and the CRC of the trailer block 20F. For example, when the end magic number is a designated normal value and the CRC value generated or otherwise obtained based on the end magic number, the current version information, and the previous version information of the trailer block 20F matches the CRC value of the trailer block 20F, it may be confirmed that the trailer block 20F is valid.

Figure 4A:
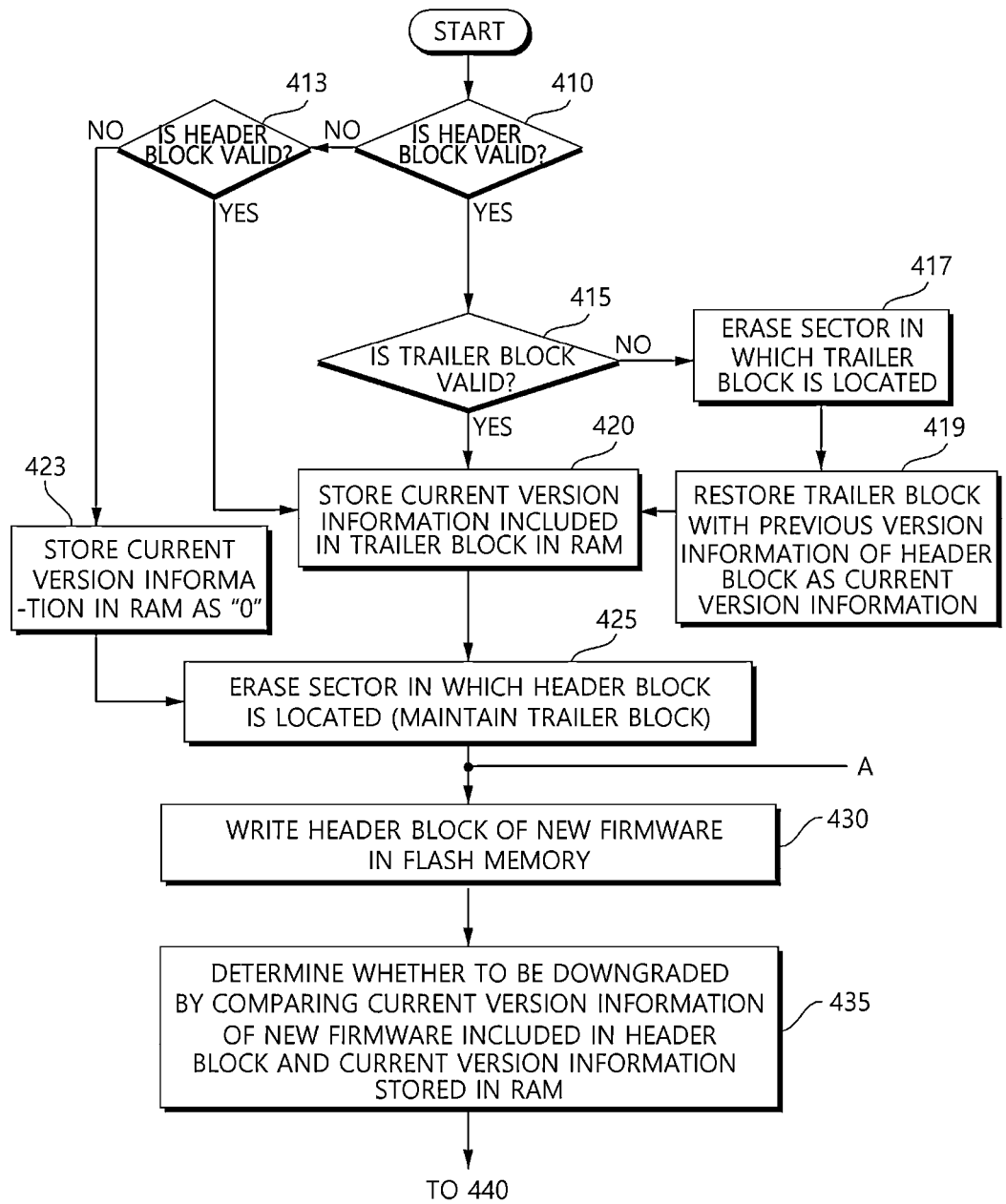
FIGS. 4A and 4B are flowcharts of a firmware update method according to an embodiment of the present disclosure.
Figure 4B:
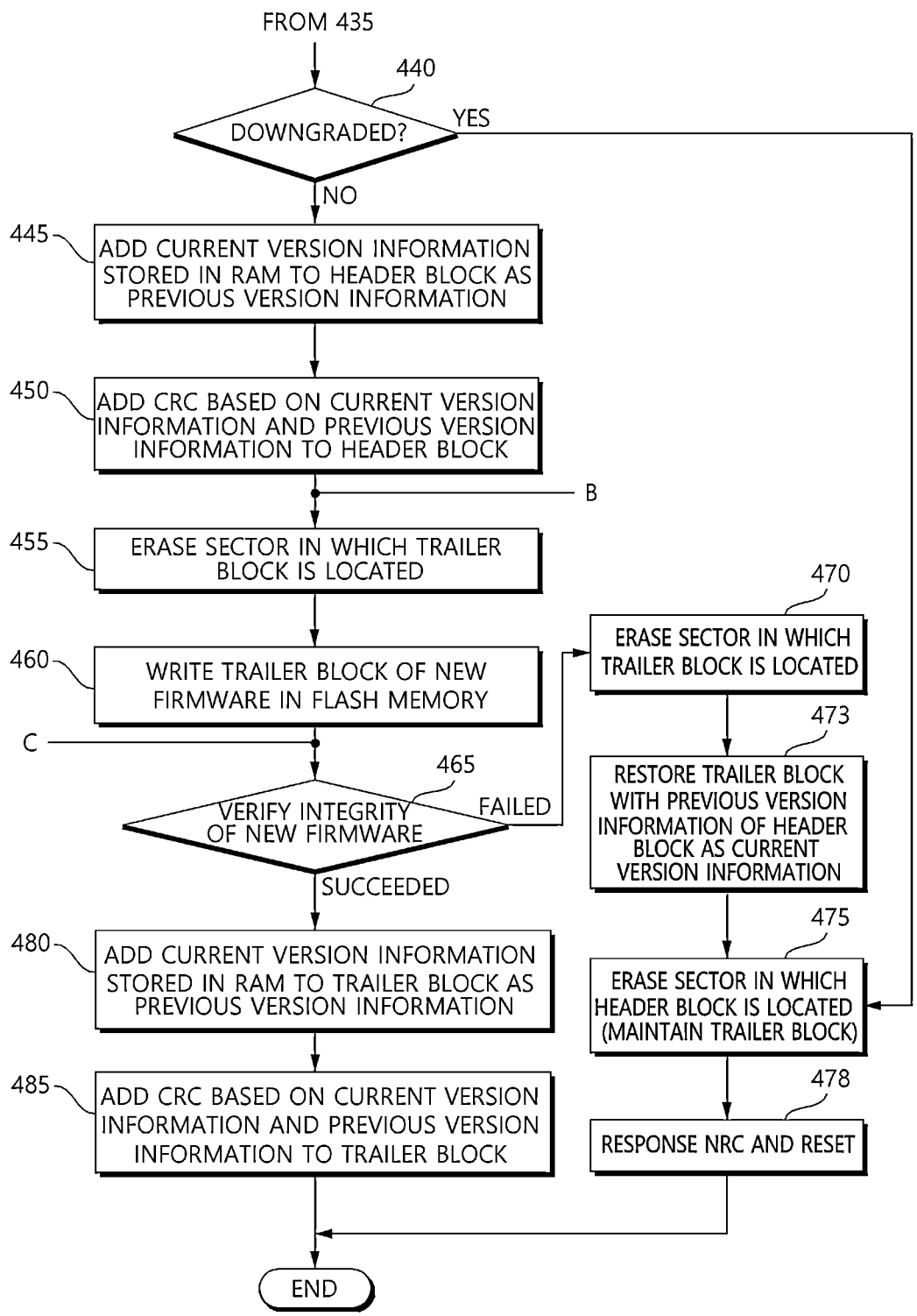

FIGS. 4A and 4B are flowcharts of a method for updating firmware, according to an embodiment of the present disclosure. The flowcharts of FIGS. 4A and 4B illustrate operation of the flash bootloader stored in the bootloader area 121 of the flash memory 120, according to an embodiment.

In step 410, the validity of the header block of the firmware stored in the flash memory 120 is confirmed. In an aspect, the validity of the header block is confirmed using the start magic number, the current version information, the previous version information, and the CRC included in the header block.

When the confirmation result of step 410 indicates that the header block is not valid, the method proceeds to step 413 at which the validity of the trailer block stored in the flash memory 120 is confirmed. In an aspect, the validity of the trailer block is confirmed using the end magic number, the current version information, the previous version information, and the CRC included in the trailer block.

When the confirmation result of step 413 indicates that the trailer block is valid, the method proceeds to step 420 at which current version information included in the trailer block is stored in the RAM 130. On the other hand, when the confirmation result of step 413 indicates that the trailer block is not valid, the method proceeds to step 423. When in step 413, it is determined that the trailer block is not valid (i.e., both the header block and the trailer block are not valid), this indicates that the flash memory 120 is in a virgin state and the firmware is installed for the first time. Accordingly, in step 423, the current version information is stored in the RAM 130 as "0" (or "N/A"). The method then proceeds to step 425.

Referring back to step 410, when the confirmation result of step 410 indicates that the header block is valid, the method proceeds to step 415 in which the validity of the trailer block stored in the flash memory 120 is confirmed.

When the confirmation result of step 415 indicates that the trailer block is valid, the method proceeds to step 420 at which current version information included in the trailer block is stored in the RAM 130. The method then proceeds to step 425.

In step 425, a sector of the flash memory 120 in which the trailer block is located is maintained and a sector in which the header block is located is erased. Generally, the flash memory is erased in the unit of sectors. Accordingly, in an aspect, the header block is erased while keeping the trailer block by erasing just before a sector of the flash memory 120 in which the trailer block is located.

In step 430, the header block of a new firmware that is downloaded is written in the flash memory 120.

In step 435, current version information of the new firmware included in the header block is compared with the current version information stored in the RAM 130 to determine whether the firmware is to be downgraded. In an aspect, when a version value of the new firmware included in the header block is equal to or higher than a version value stored in the RAM 130, it is determined that the firmware is not downgraded.

Referring to step 440, if it is determined that the firmware is not downgraded, the method proceeds to step 445 in which the current version information that is stored in the RAM 130 is added to the header block written in the flash memory 120 as previous version information.

In step 450, a start magic number is added to the header block written in the flash memory 120. Also, a CRC generated based on the current version information and the previous version information is added to the header block written in the flash memory 120.

In step 455, a sector in which the trailer block is located is erased.

In step 460, the trailer block of a new firmware that is downloaded is written in the flash memory 120.

In step 465, the integrity of the new firmware to be downloaded is verified. In as aspect, a known technique may be utilized in step 465 to verify the integrity of the new firmware based on electronic signature included in the new firmware.

When the integrity of the new firmware is verified in step 465, the method proceeds to step 480 in which the current version information that is stored in the RAM 130 is added to the trailer block written in the flash memory 120 as previous version information.

In step 485, an end magic number is added to the trailer block written in the flash memory 120. Also, a CRC generated based on the current version information and the previous version information is added to the trailer block written in the flash memory 120. When the steps up to and including the step 485 as described above are normally performed, the firmware reprogramming is successfully completed.

FIGS. 5A to 5K are views for explaining an example of a process of normally performing the firmware reprogramming through the above-described steps 410, 415, 420 to 460, 465, 480, and 485.

Referring to FIGS. 5A to 5K, information of the header block 10F and the trailer block 20F of the firmware stored in the flash memory 120, information of the header block 10D and the trailer block 20D of the new firmware to be downloaded, and information stored in the RAM 130 are shown. For the sake of convenience, the start magic number and the end magic number are omitted.

Figure 5A:
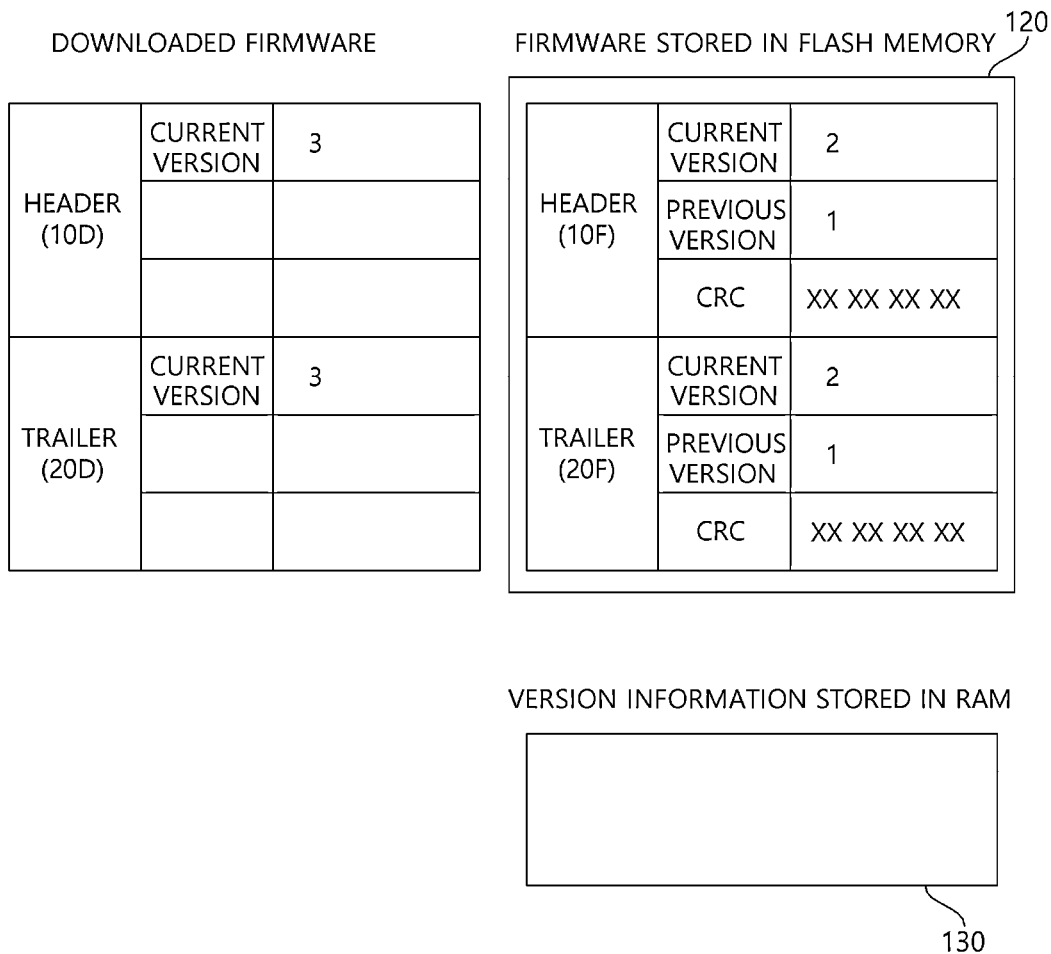
FIGS. 5A to 5K are views for explaining an example of a process of successfully performing firmware reprogramming according to an embodiment of the present disclosure.

Referring to FIG. 5A, in the header block 10F and the trailer block 20F of the firmware stored in the flash memory 120, the current version is 2, the previous version is 1, and the CRC is normal. In the header block 10D and the trailer block 20D of the new firmware to be downloaded, the current version is 3.

In step 410, it is confirmed that the header block 10F of the firmware stored in the flash memory 120 is valid and in step 415, it is also confirmed that the trailer block 20F of the firmware stored in the flash memory 120 is valid.

Figure 5B:
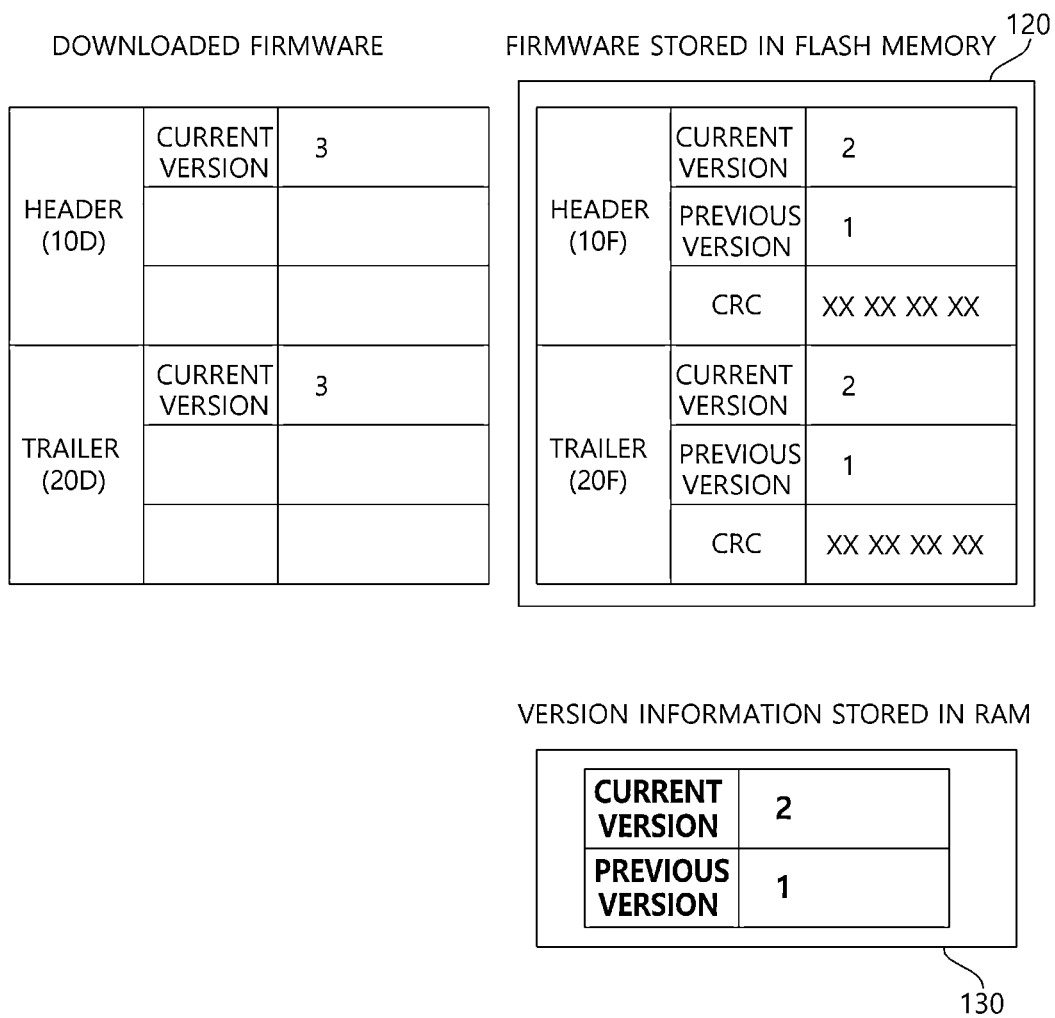

Referring to FIG. 5B, in step 420, current version 2 and previous version 1 of the trailer block 20F are stored in the RAM 130.

Figure 5C:
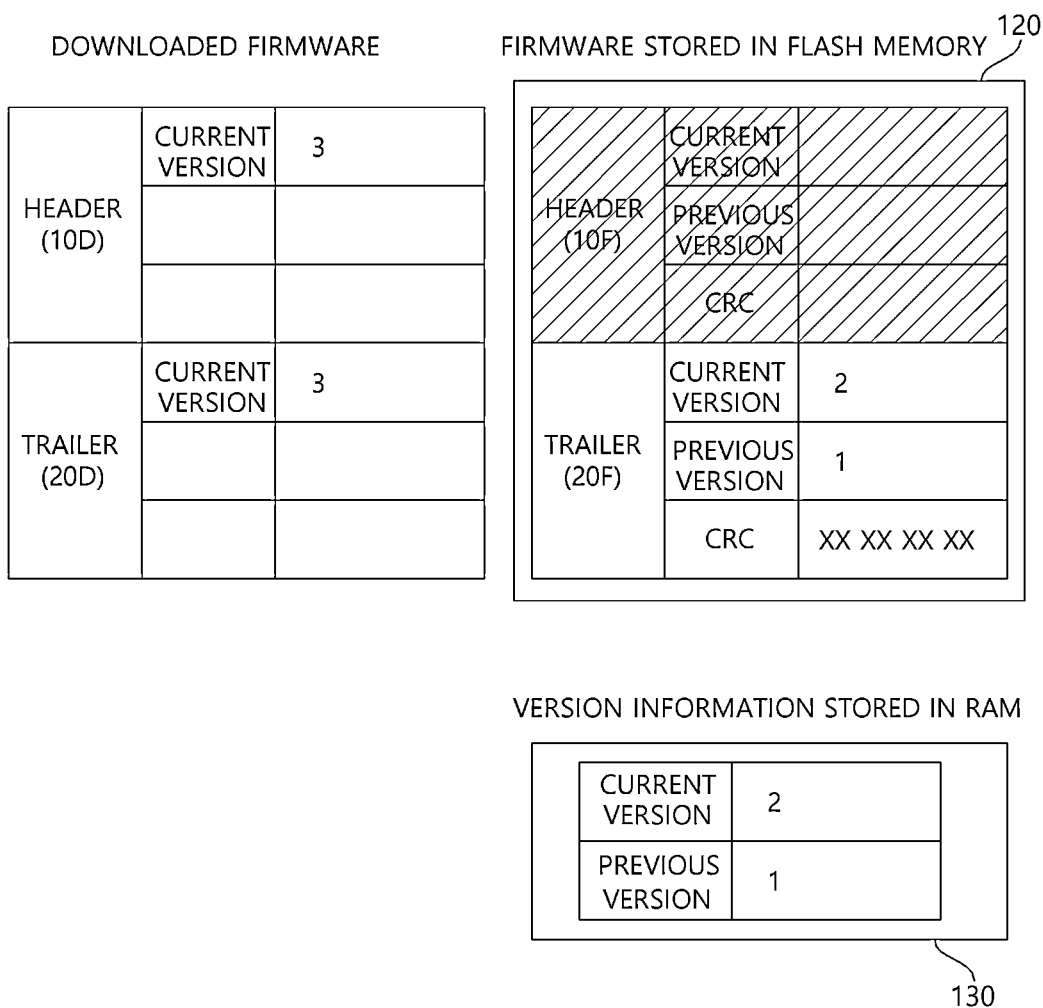

Referring to FIG. 5C, in step 425, a sector in which the header block 10F is located is erased from the flash memory 120 while maintaining the sector in which the trailer block 20F is located in the flash memory 120.

Figure 5D:
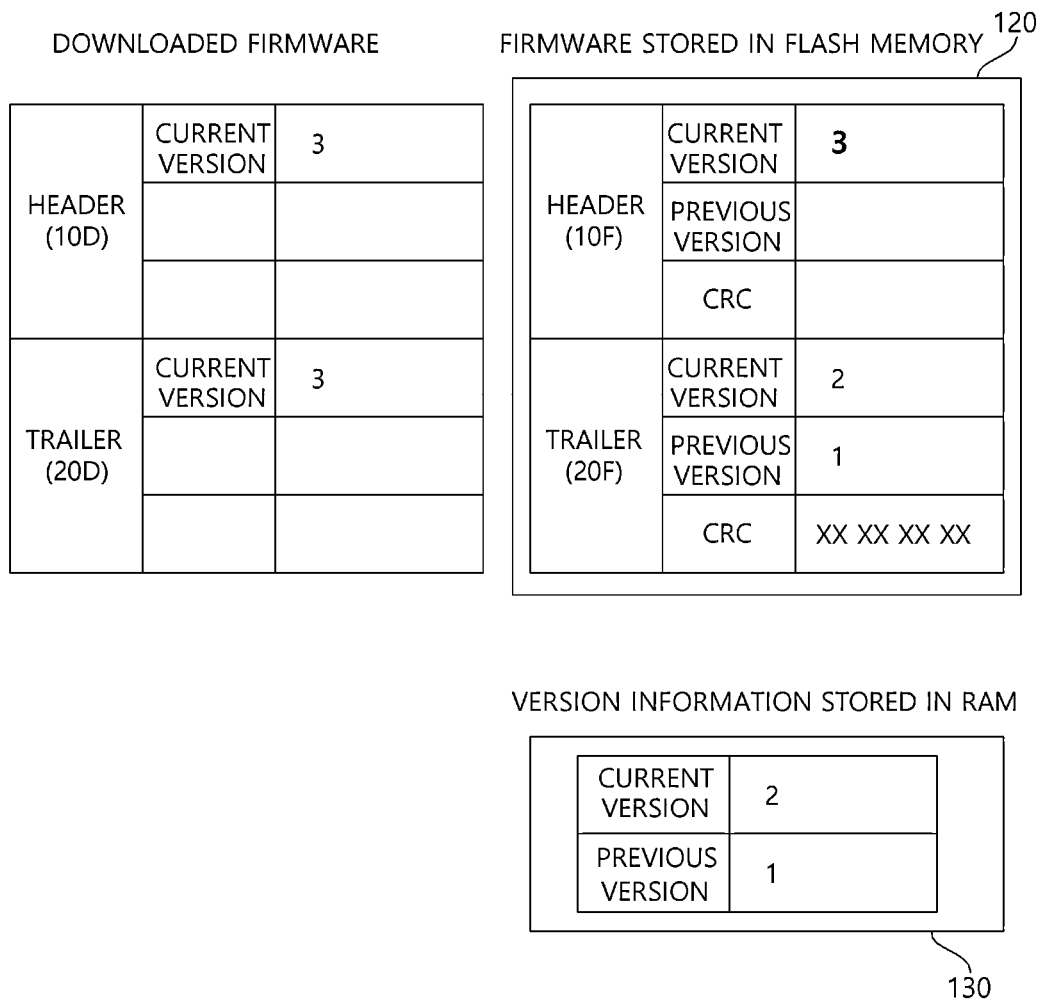

Referring to FIG. 5D, in step 430, a header block 10D of the new firmware to be downloaded is written in the flash memory 120. Accordingly, a current version of the header block 10F of the flash memory 120 is 3.

Figure 5E:
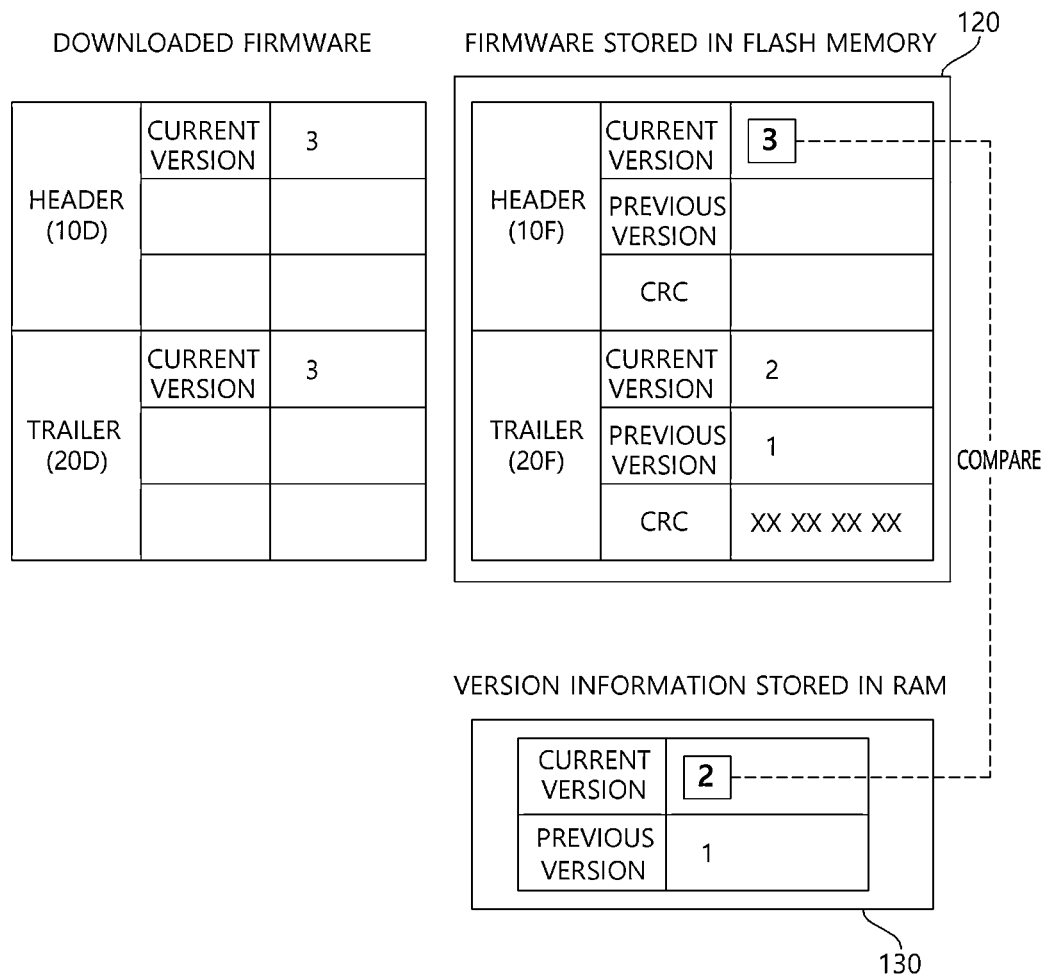

Referring to FIG. 5E, in step 435, a current version 3 of the new firmware included in the header block 10F of the flash memory 120 is compared with the current version 2 stored in the RAM 130 and it is determined in step 440 that firmware is not downgraded.

Figure 5F:
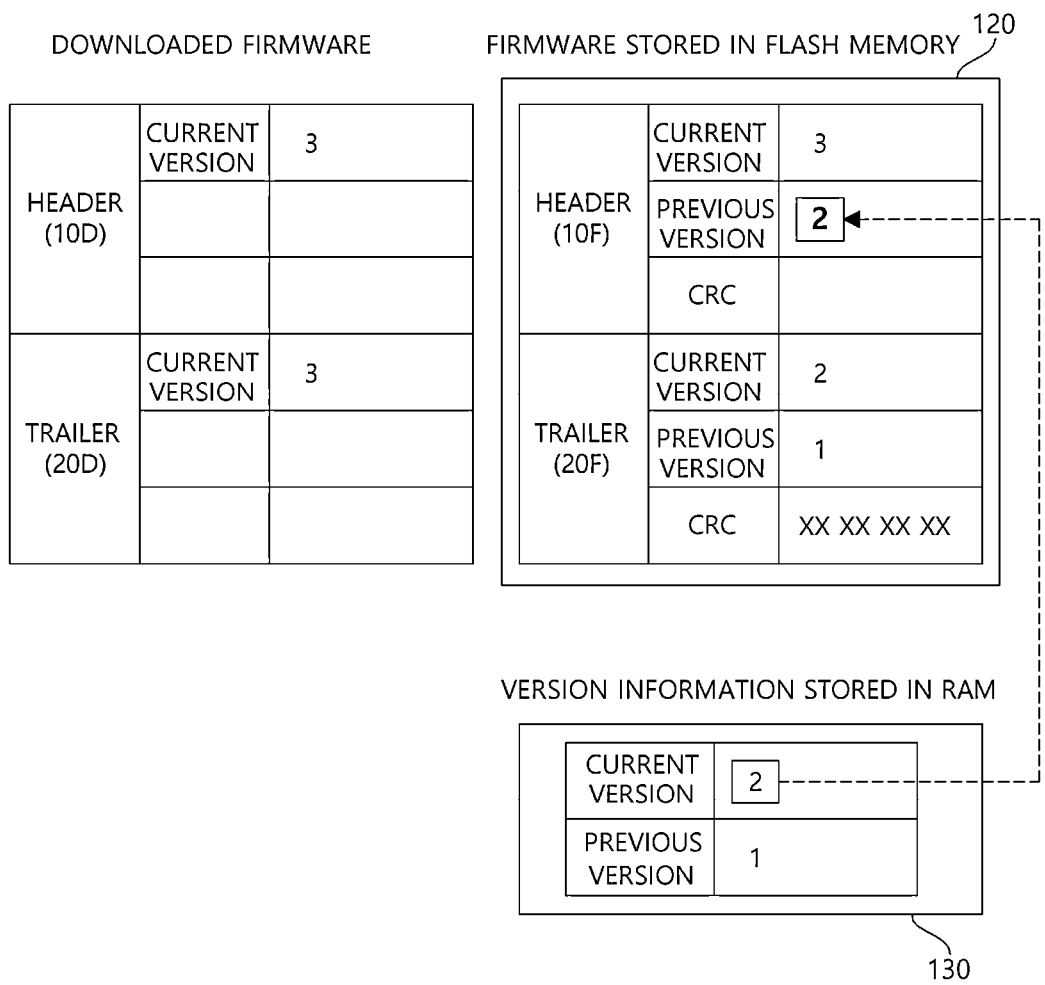

Referring to FIG. 5F, in step 445, a current version 2 stored in the RAM 130 is added to the header block 10F of the flash memory 120 as previous version information.

Figure 5G:
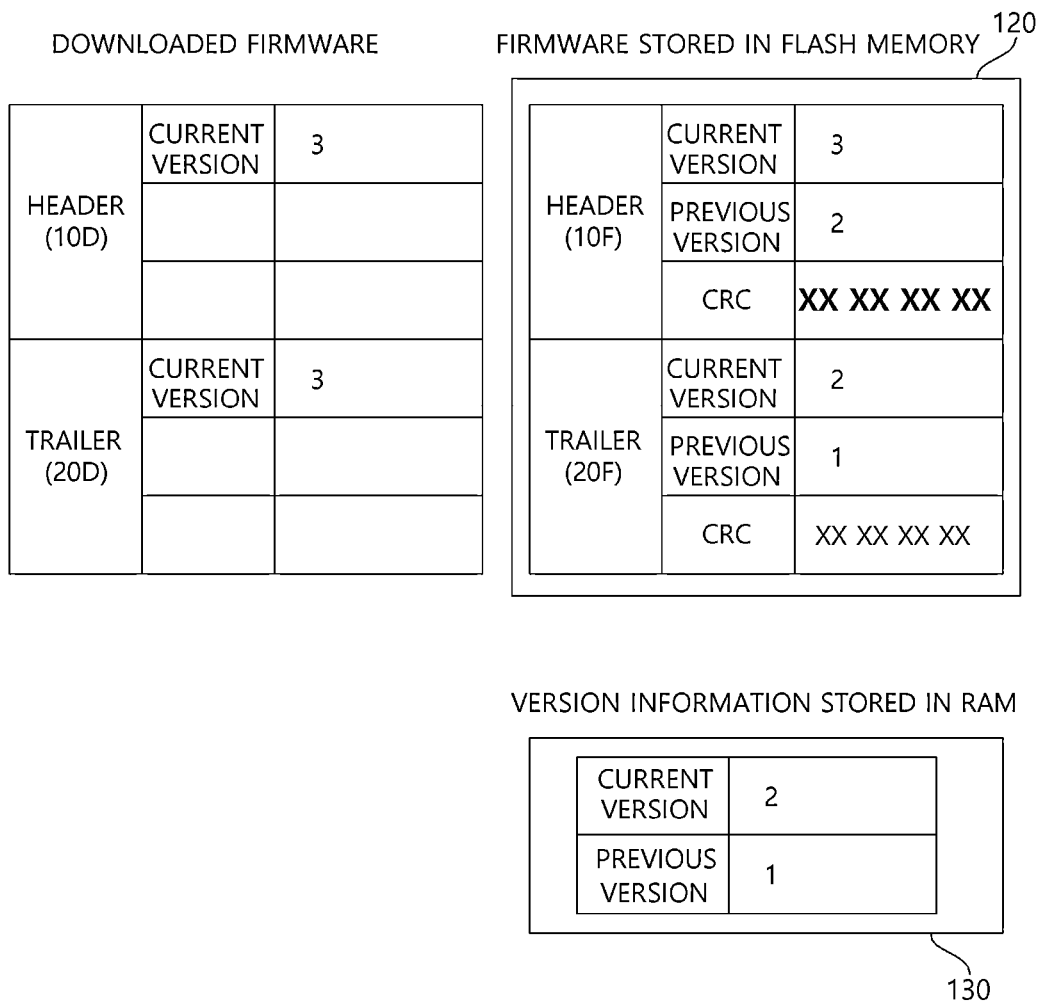

Referring to FIG. 5G, in step 450, a start magic number is added to the header block 10F of the flash memory 120. Also, a CRC generated based on the current version 3 and the previous version 2 is added to the header block 10F of the flash memory 120.

Figure 5H:
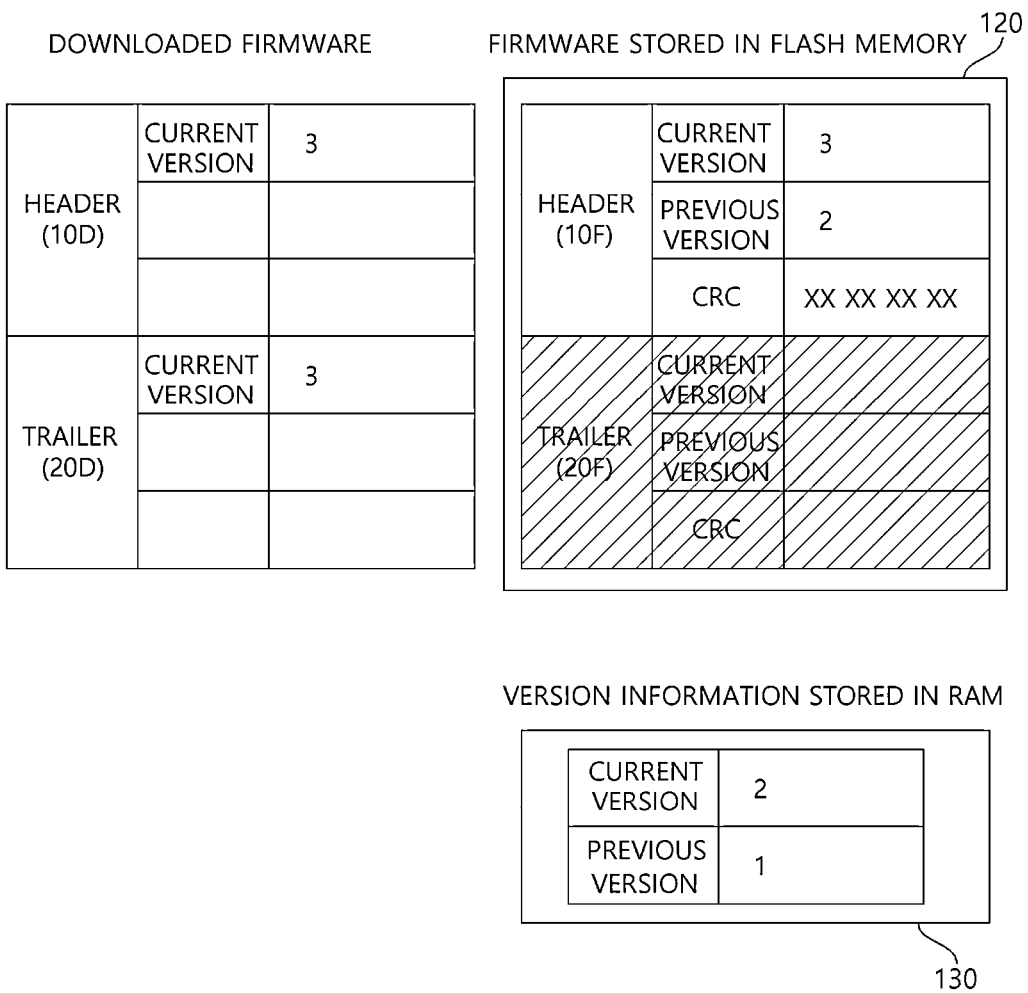

Referring to FIG. 5H, in step 455, a sector in which the trailer block 20F is located is erased from the flash memory 120.

Figure 5I:
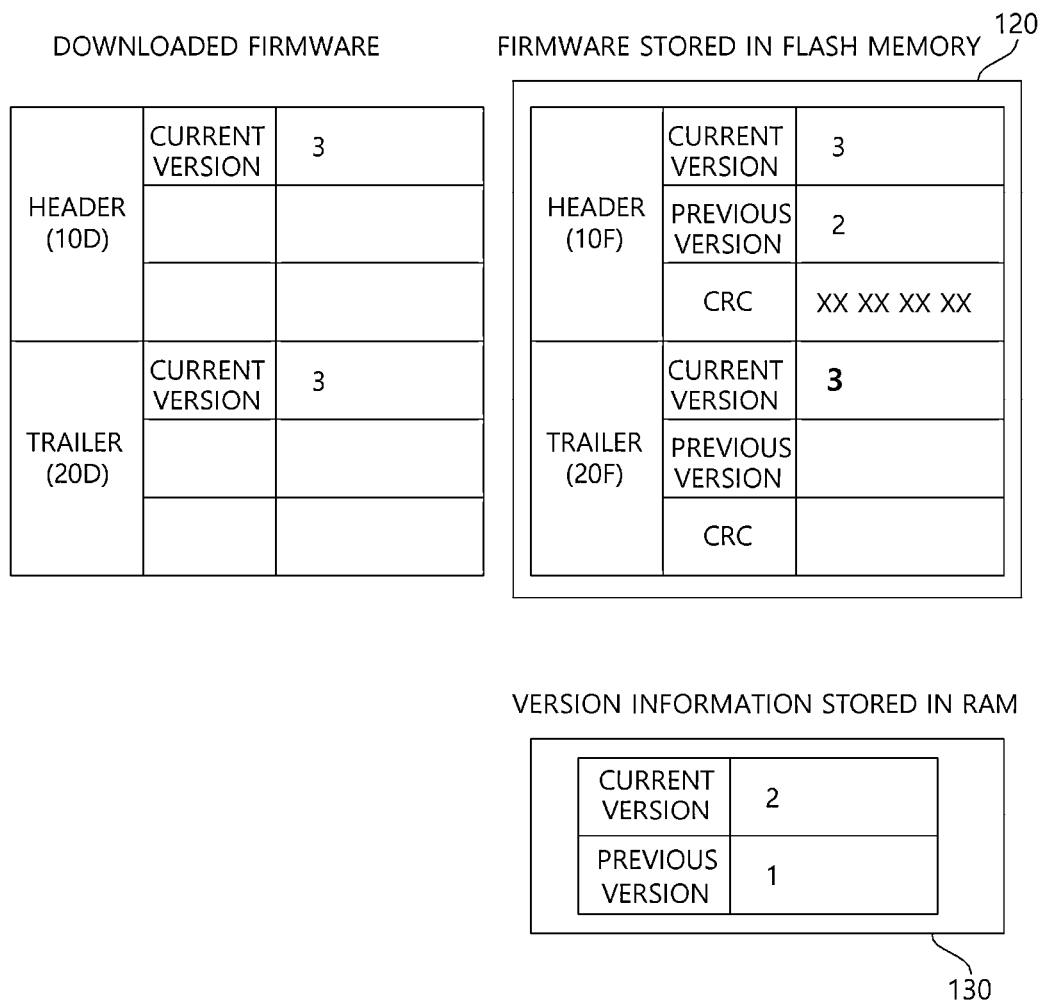

Referring to FIG. 5I, in step 460, a trailer block 20D of the new firmware to be downloaded is written in the flash memory 120. Accordingly, a current version of the trailer block 20F of the flash memory 120 is 3.

Figure 5J:
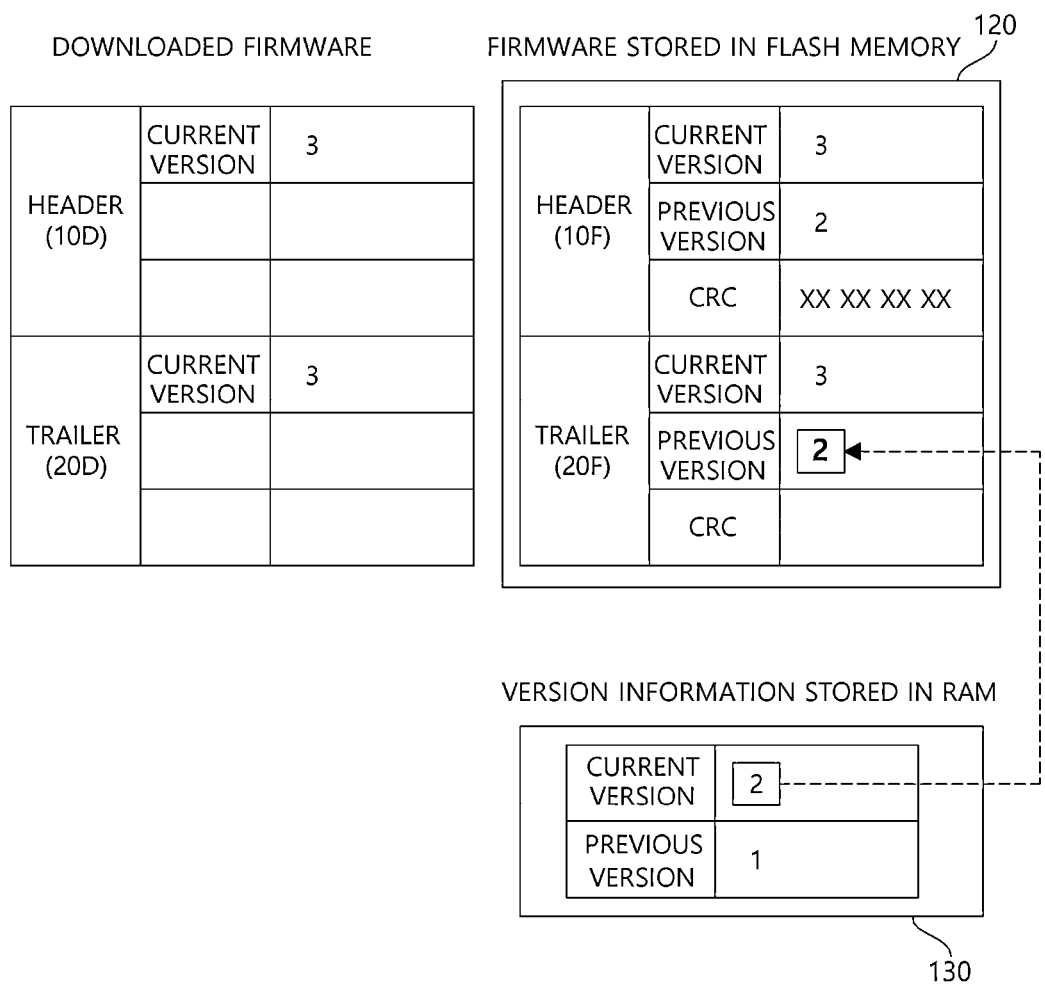

When the integrity of the new firmware downloaded in the flash memory 120 is verified in step 465, as illustrated in FIG. 5J, the current version 2 stored in the RAM 130 is added to the trailer block 20F of the flash memory 120 as previous version information in step 480.

Figure 5K:
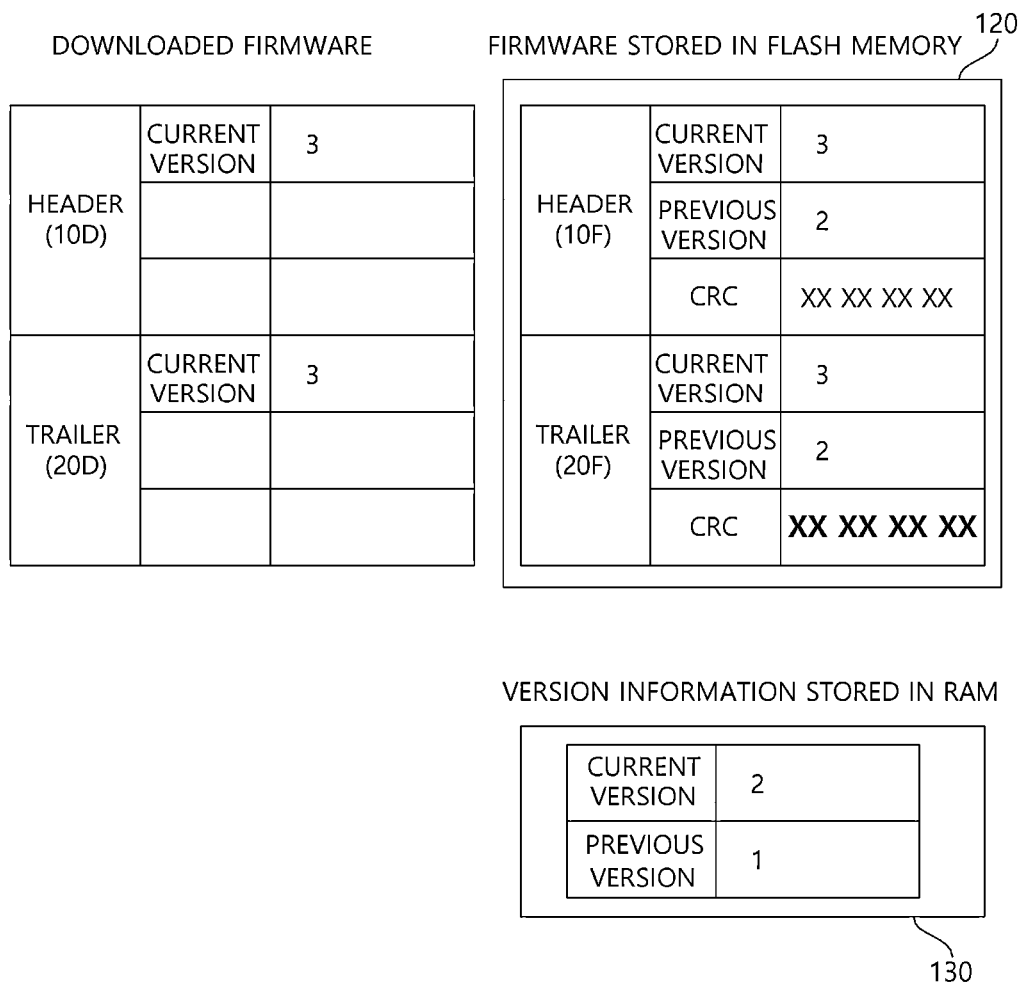

Referring to FIG. 5K, in step 485, an end magic number is added to the trailer block 20F of the flash memory 120. Also, a CRC generated based on the current version 3 and the previous version 2 is added to the trailer block 20F of the flash memory 120. The firmware reprogramming is thus successfully completed.

Figure 6A:
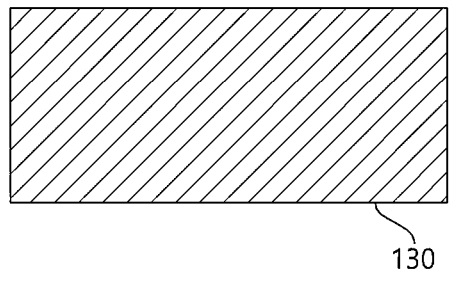
FIGS. 6A and 6B are views for explaining an example of a process of performing firmware reprogramming after a "battery off" situation occurs at a point A of FIG. 4A, according to an embodiment of the present disclosure.
Figure 6B:
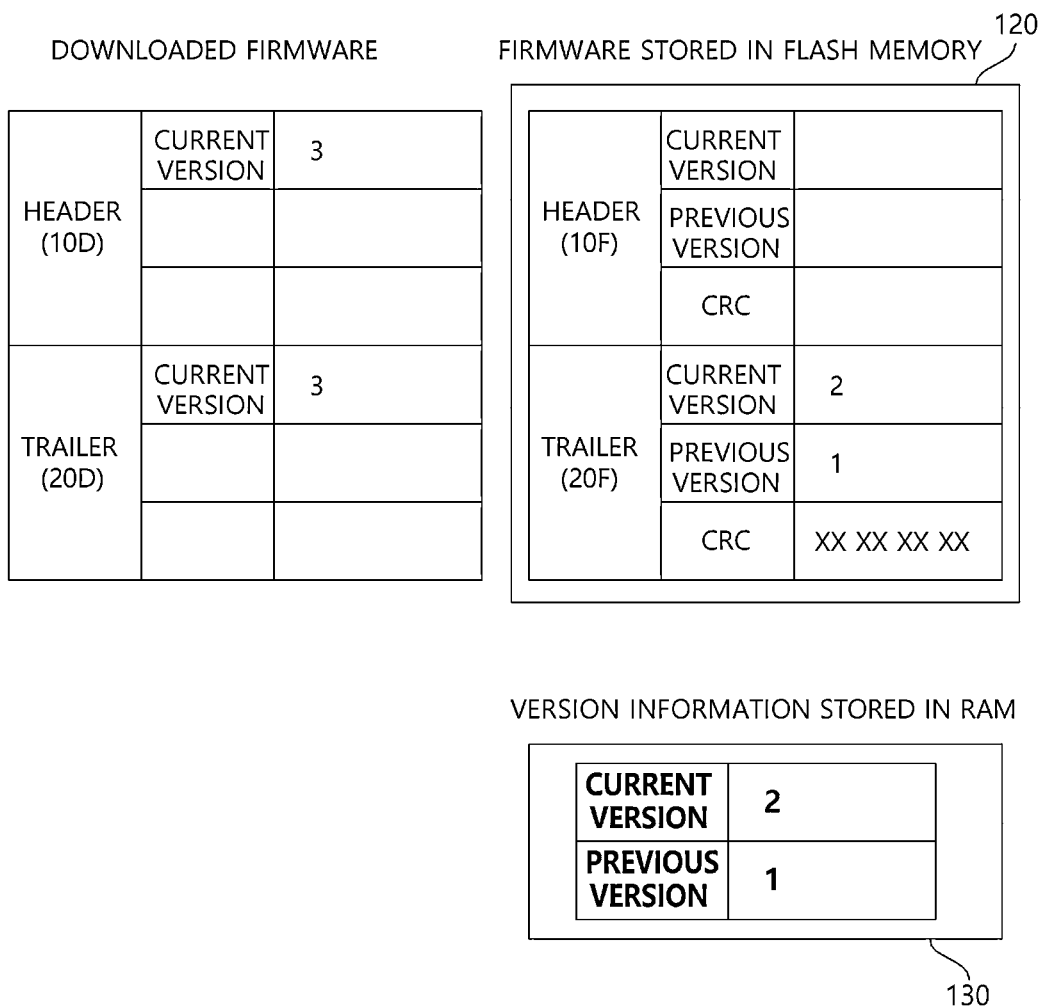

FIGS. 6A and 6B are views for explaining an example of a process of performing firmware reprogramming after a "battery off" situation occurs at a point A of FIG. 4A.

Referring to FIGS. 4A and 5C, it is assumed that the "battery off" situation occurs at the point "A" after step 425 in which a sector in which the header block 10F is located is erased from the flash memory 120 while the sector in which the trailer block is located is maintained in the flash memory 120. Therefore, as illustrated in FIG. 6A, the version information of the RAM 130 is lost and the version information of the trailer block 20F remains.

When the step 410 of FIG. 4A is performed again for firmware reprogramming in this state, the header block 10F of the flash memory 120 is not valid. The method thus proceeds to step 413 at which it is confirmed that the trailer block 20F of the flash memory 120 is valid. Accordingly, the method proceeds to step 420 at which the current version 2 and the previous version 1 of the trailer block 20F are stored the RAM 130, as illustrated in FIG. 6B. When, in step 425, the sector in which the header block 10F is located is erased from the flash memory 120 while maintaining a sector in which the trailer block is located in the flash memory 120 in the state of FIG. 6B, the sector becomes the state of FIG. 5C. As a result, a subsequent firmware reprogramming cab be successfully completed. As described above, according to an embodiment of the present disclosure, even if a "battery off" situation occurs after a sector in which the header block 10F is located is erased, the current version is correctly recognized by means of the trailer block 20F during the subsequent firmware reprogramming process so that the firmware reprogramming may be successfully completed.

Figure 7A:
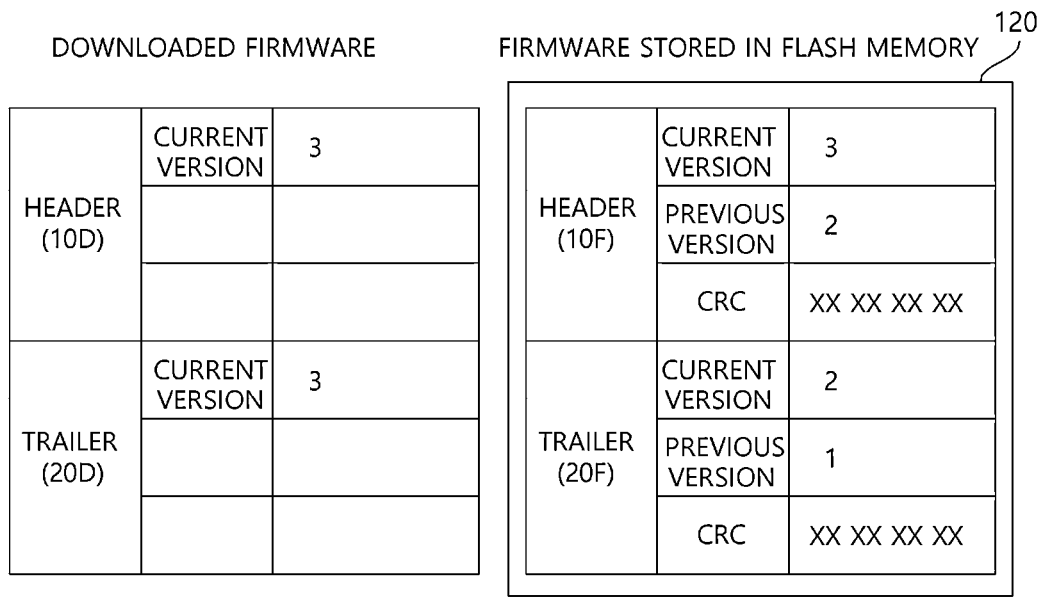
FIGS. 7A and 7B are views for explaining an example of a process of performing firmware reprogramming after a "battery off" situation occurs at a point B of FIG. 4B, according to an embodiment of the present disclosure.
Figure 7A:
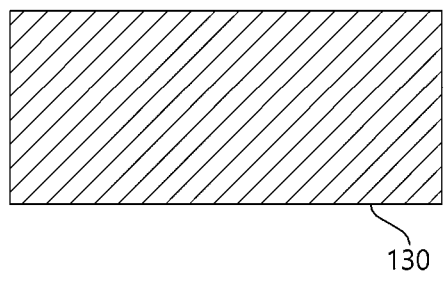
Figure 7B:
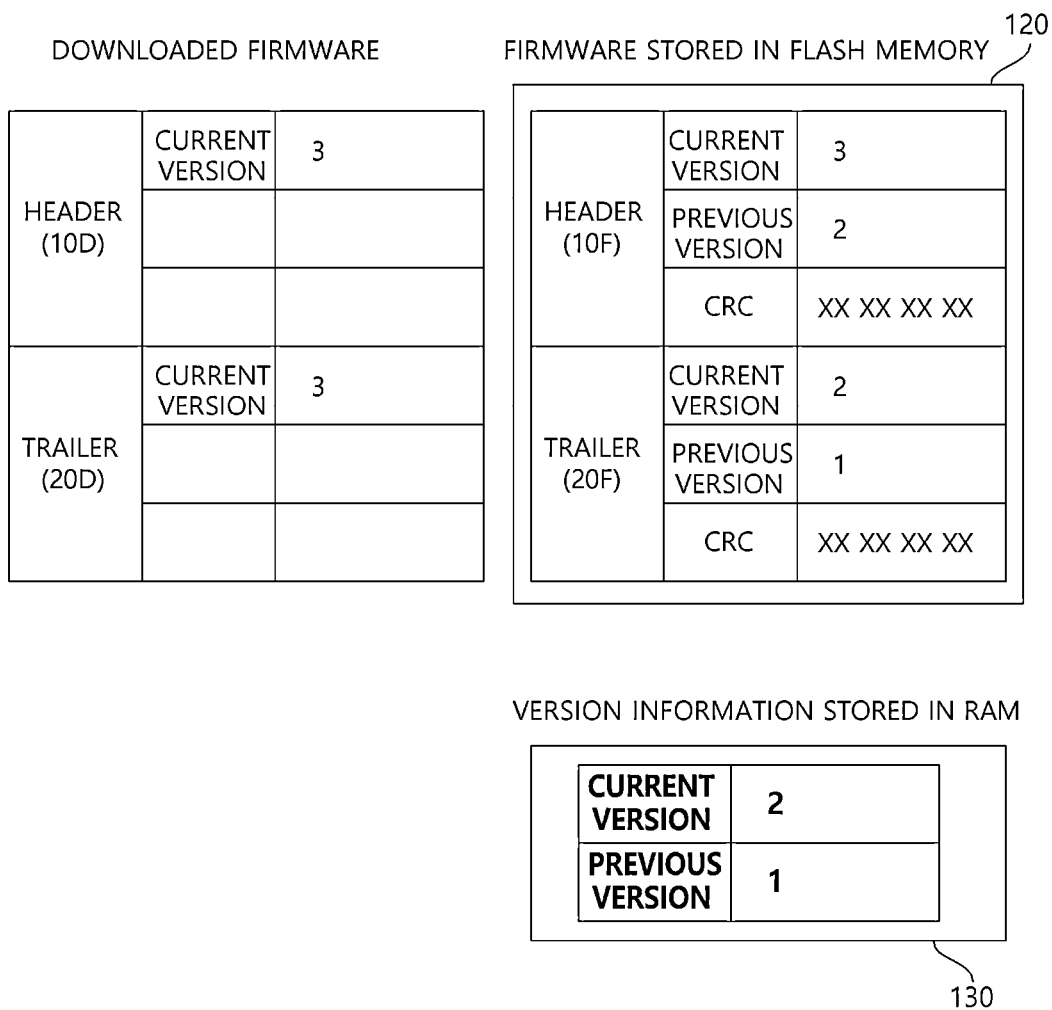

FIGS. 7A and 7B are views for explaining an example of a process of performing firmware reprogramming after a "battery off" situation occurs at a point B of FIG. 4B.

Referring to FIGS. 4B and 5G, it is assumed that the "battery off" situation occurs at a point "B" after a start magic number and a CRC generated based on the current version 3 and the previous version 2 are added to the header block 10F of the flash memory 120 in step 450. Therefore, as illustrated in FIG. 7A, the version information of the RAM 130 is lost and the version information of the trailer block 20F remains. The version information of the header block 10F thus becomes version information of a new firmware in which the reprogramming is not completed so that the version information of the header block 10F does not match the version information of the trailer block 20F.

When the step 410 of FIG. 4A is performed again for a subsequent firmware reprogramming in this state, the header block 10F of the flash memory 120 is confirmed to be valid. The method thus proceeds to step 413 at which it is confirmed that the trailer block 20F of the flash memory 120 is valid. Accordingly, the method proceeds to step 420, and as illustrated in FIG. 7B, current version 2 and previous version 1 of the trailer block 20F are stored in the RAM 130. When, in step 425, the sector in which the header block 10F is located is erased from the flash memory 120 while maintaining a sector in which the trailer block 20F is located in the flash memory 120 in the state of FIG. 7B, the sector becomes a state of FIG. 5C. Accordingly, the subsequent firmware reprogramming is successfully completed by the subsequent processes of the sector. As described above, according to an embodiment of the present disclosure, even though the "battery off" situation occurs in a state in which the version information of the header block 10F and the version information of the trailer block 20F do not match, the current version is correctly recognized by the trailer block 20F during the subsequent firmware reprogramming to successfully complete the firmware reprogramming.

Referring to back to FIG. 4A, when it is determined in step 415 that the trailer block is not valid the sector in which the trailer block is located is erased from the flash memory 120 in step 417.

Next, in step 419, based on the determination that the header block is valid in step 410, the trailer block is restored with the previous version information of the header block as current version information. Thereafter, the method proceeds to step 420.

Figure 8A:
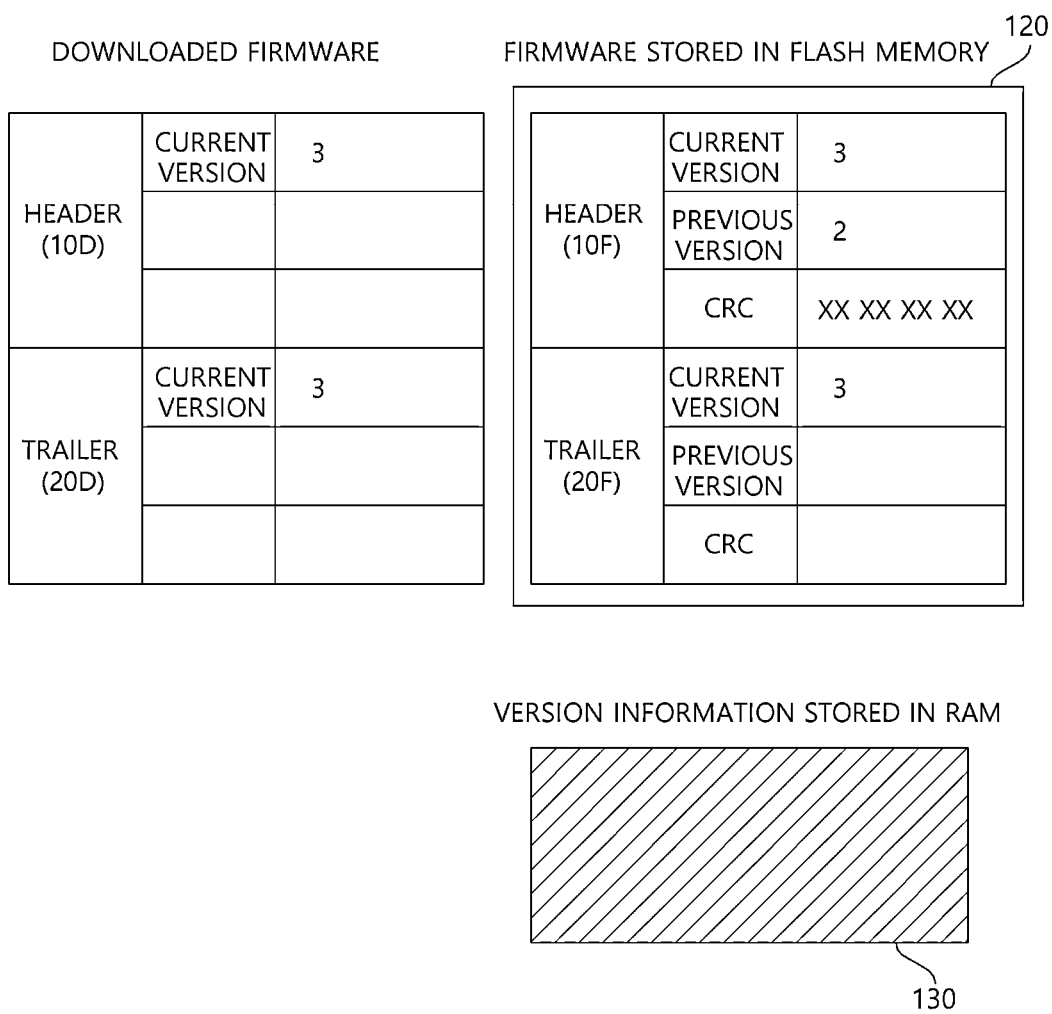
FIGS. 8A to 8C are views for explaining an example of a process of performing firmware reprogramming after a "battery off" situation occurs at a point C of FIG. 4B, according to an embodiment of the present disclosure.
Figure 8B:
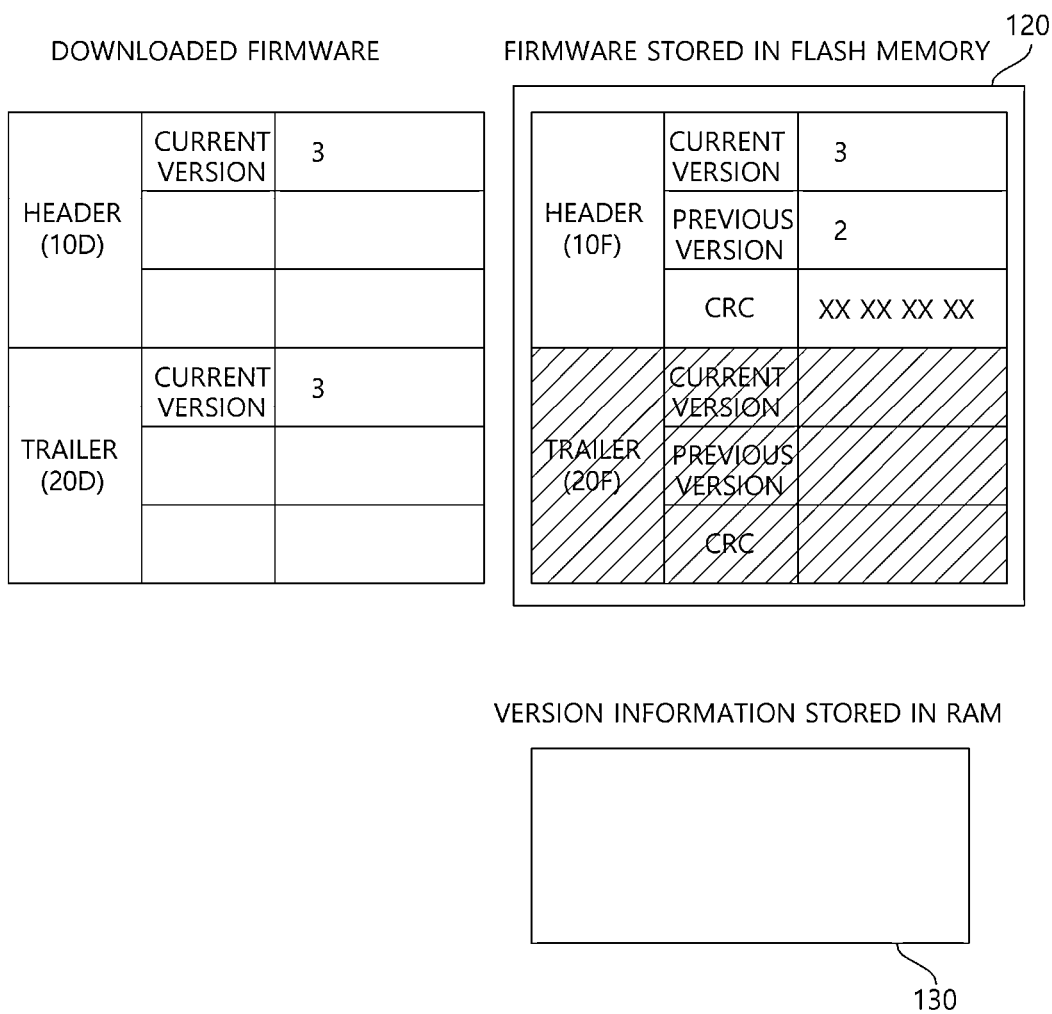
Figure 8C:
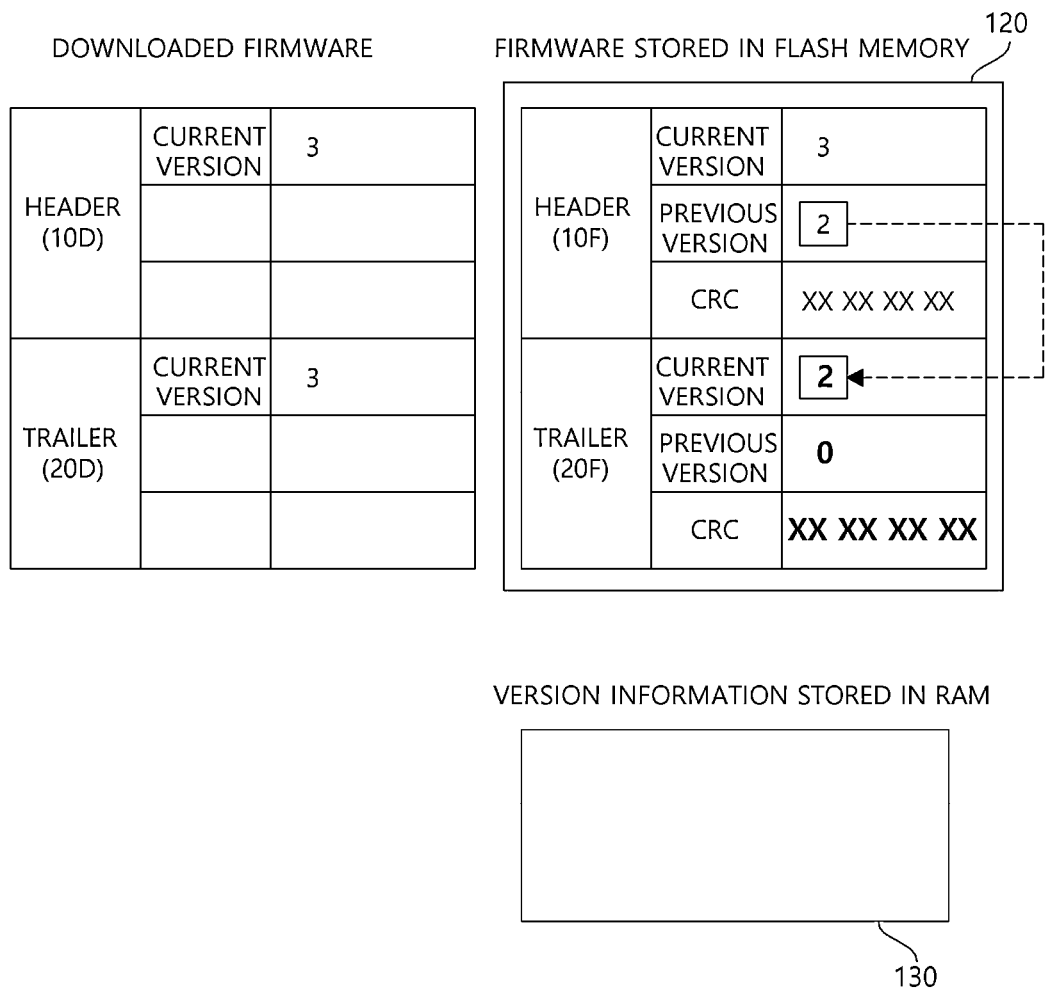

FIGS. 8A to 8C are views for explaining an example of a process of performing firmware reprogramming after a "battery off" situation occurs at a point C of FIG. 4B.

Referring to FIGS. 4B and 5I, it is assumed that the "battery off" situation occurs at the point "C" after the trailer block 20D of the new firmware is written in the flash memory 120 in step 460. Therefore, as illustrated in FIG. 8A, version information of the RAM 130 is lost while the header block 10F has a current version 3, a previous version 2, and a CRC, and the trailer block 20F has a current version 3, but does not have a previous version and a CRC.

In this state, when step 410 of FIG. 4A is performed for a subsequent firmware reprogramming, it is confirmed that the header block 10F of the flash memory 120 is valid. The method thus proceeds to step 415 at which it is determined that the trailer block 20F it is not valid since the trailer 20F does not have the previous version and the CRC.

As illustrated in FIG. 8B, in step 417, the sector in which the trailer block 20F is located is erased from the flash memory 120. In step 419, as illustrated in FIG. 8C, the previous version 2 of the header block 10F that is confirmed to be valid becomes current version information of the trailer block 20F. The previous version of the trailer block 20F is recorded as "0" (or an arbitrary value) and a CRC is generated based on the current version and the previous version of the trailer block 20F. Next, as illustrated in FIG. 4A, the method proceeds to step 420. However, only the current version information of the trailer block 20F stored in the RAM 130 in step 420 is meaningful, but the previous version and the CRC value of the trailer block 20F are not important since the sector in which the trailer block 20F is located is erased in step 455. Accordingly, the firmware reprogramming is successfully completed through the subsequent processes to step 420 after step 419. As described above, according to an embodiment of the present disclosure, even though the "battery off" situation occurs after writing a trailer block 20D of a new firmware in the flash memory 120 and before verifying the integrity of the new firmware, the current version information of the trailer block 20F is restored using previous version information of the header block 10F. Therefore, the current version is correctly recognized by means of the trailer block 20F during the subsequent firmware reprogramming process, and the firmware reprogramming is thus successfully completed.

Next, referring to FIG. 4B, when, in step 440, if it is determined based on the comparison in step 435 that the firmware is to be downgraded, the method proceeds to step 475 in which the sector in which the trailer block is located is maintained in the flash memory 120 and the sector in which the header block is located is erased from the flash memory 120.

In step 478, a negative response code (NRC) is responded and the firmware is reset.

FIGS. 9A to 9F are views for explaining an example of a process of performing firmware reprogramming again after it is determined that the firmware is downgraded.

Figure 9A:
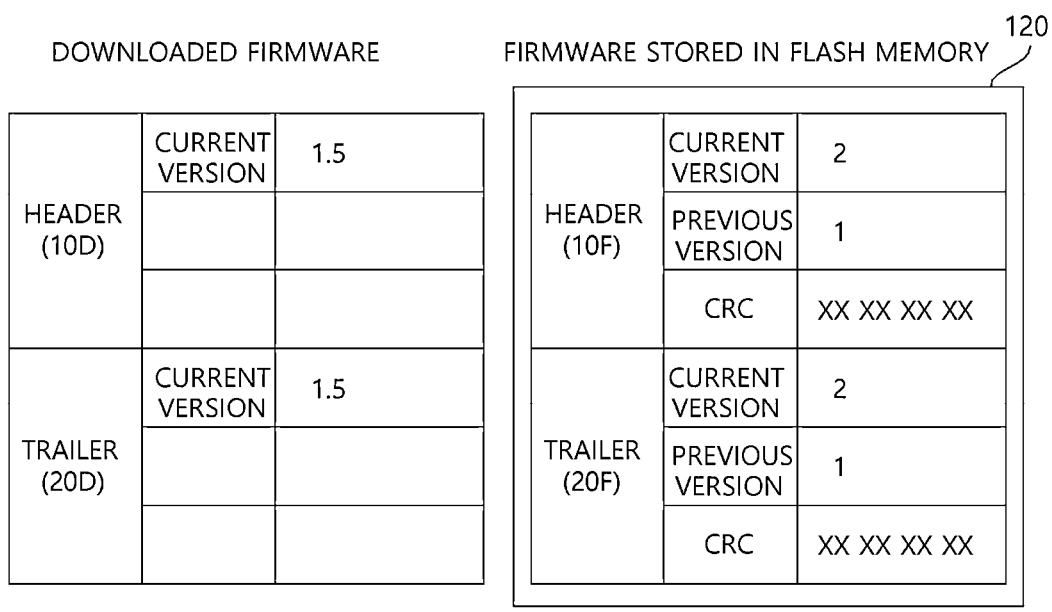
FIGS. 9A to 9F are views for explaining an example of a process of performing firmware reprogramming again after it is determined that the firmware is to be downgraded, according to an embodiment of the present disclosure.
Figure 9A:
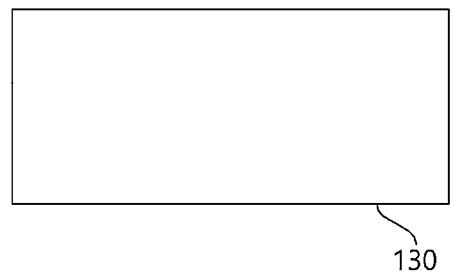

Referring to FIG. 9A, it is assumed that a current version of the firmware stored in the flash memory 120 is 2 and a version of a new firmware to be downloaded is 1.5.

In step 410, it is confirmed that the header block 10F of the firmware stored in the flash memory 120 is valid and in step 415, it is also confirmed that the trailer block 20F of the firmware stored in the flash memory 120 is valid.

Figure 9B:
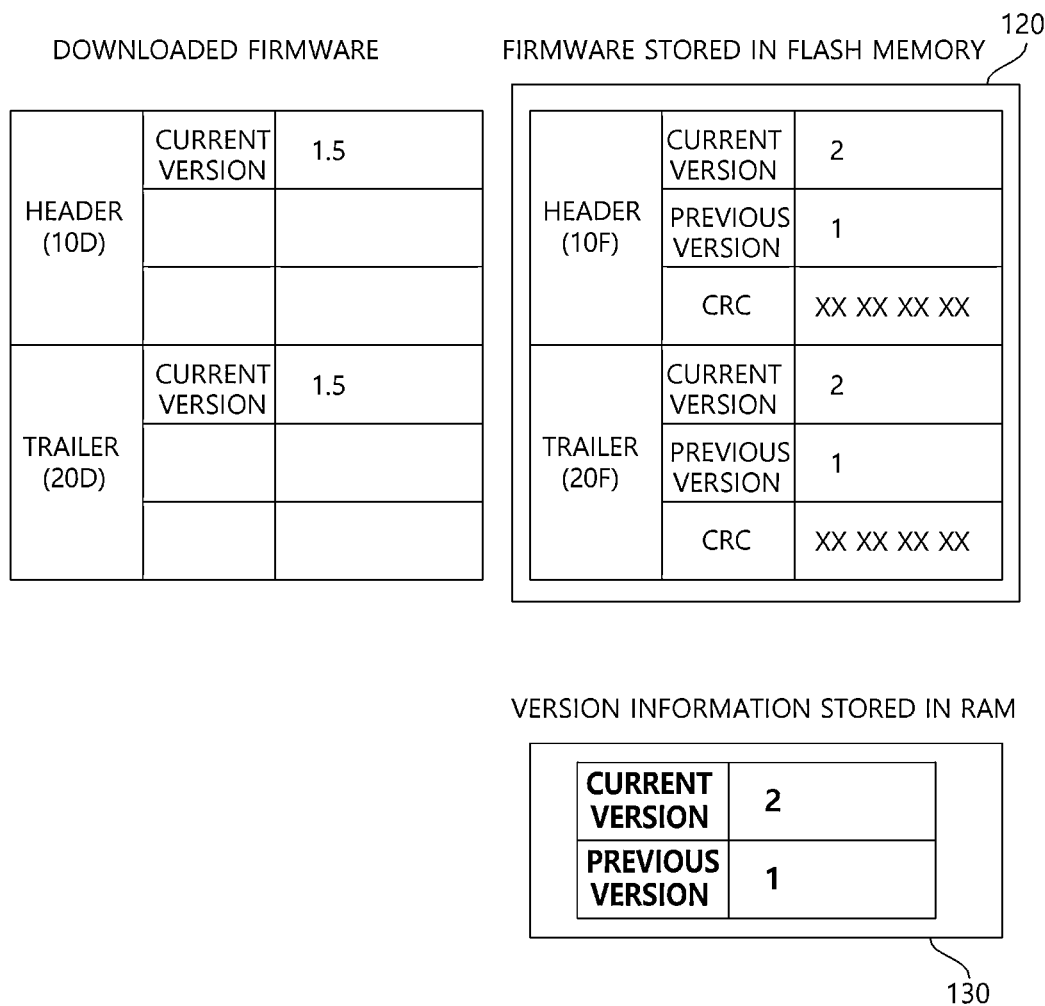

Referring to FIG. 9B, in step 420, current version 2 and previous version 1 of the trailer block 20F are stored in the RAM 130.

Figure 9C:
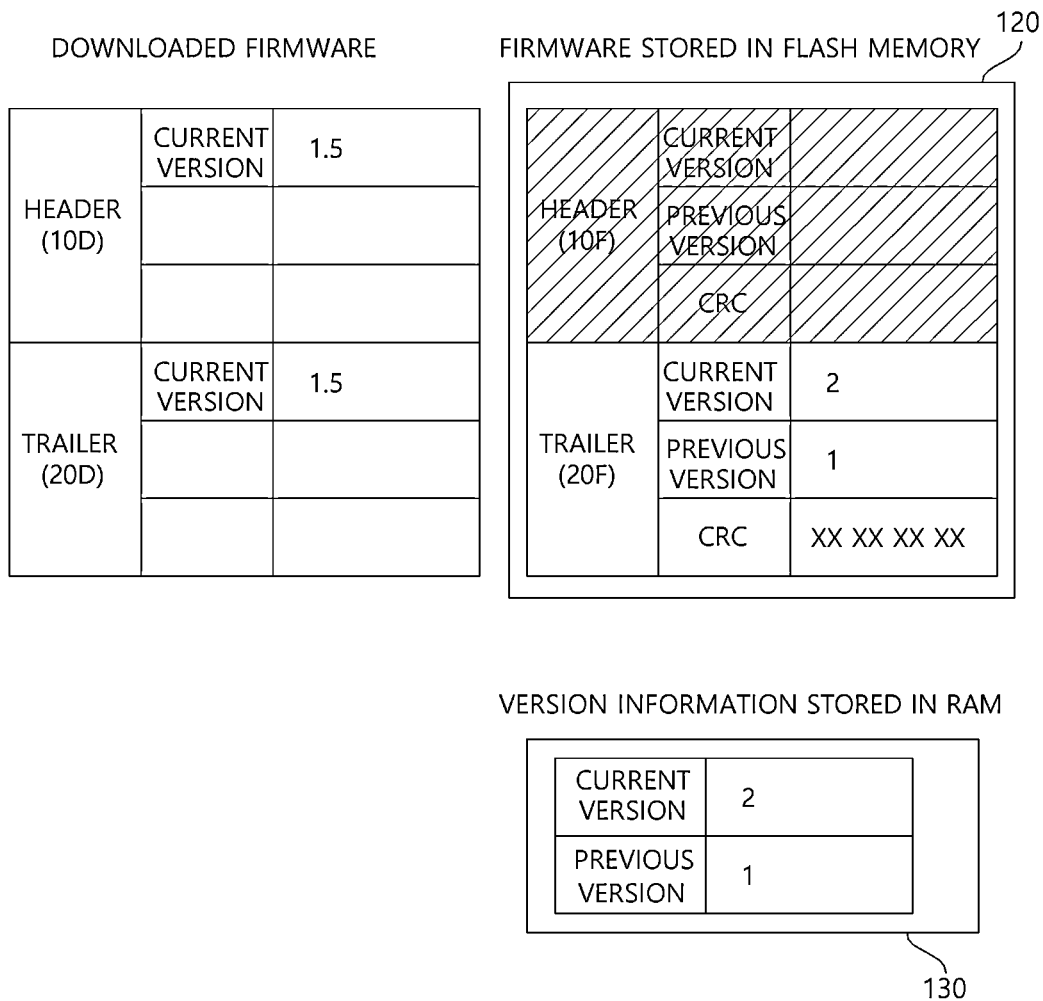

Referring to FIG. 9C, in step 425, a sector in which the header block 10F is located is erased from the flash memory 120 while maintaining the sector in which the trailer block 20F is located in the flash memory 120.

Figure 9D:
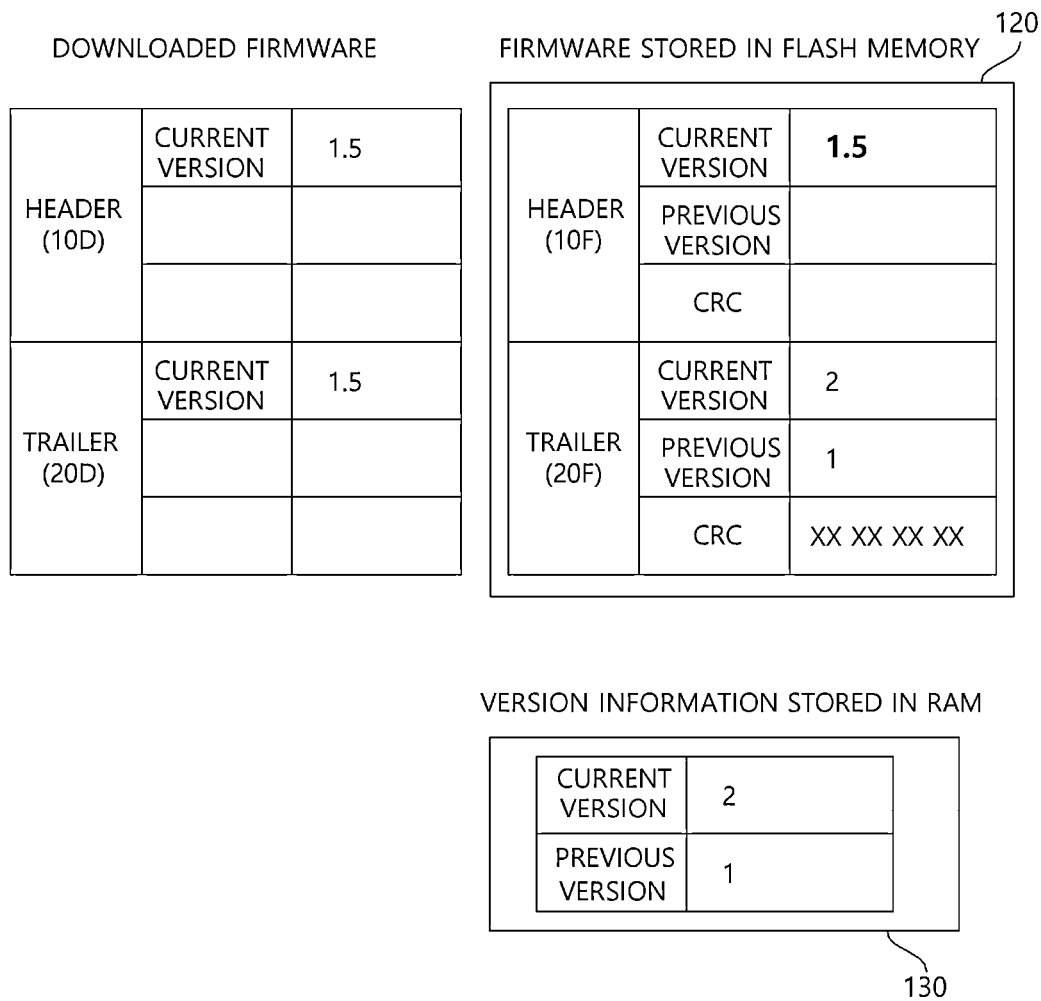

Referring to FIG. 9D, in step 430, a header block 10D of a new firmware to be downloaded is written in the flash memory 120. Accordingly, a current version of the header block 10F of the flash memory 120 is 1.5.

Figure 9E:
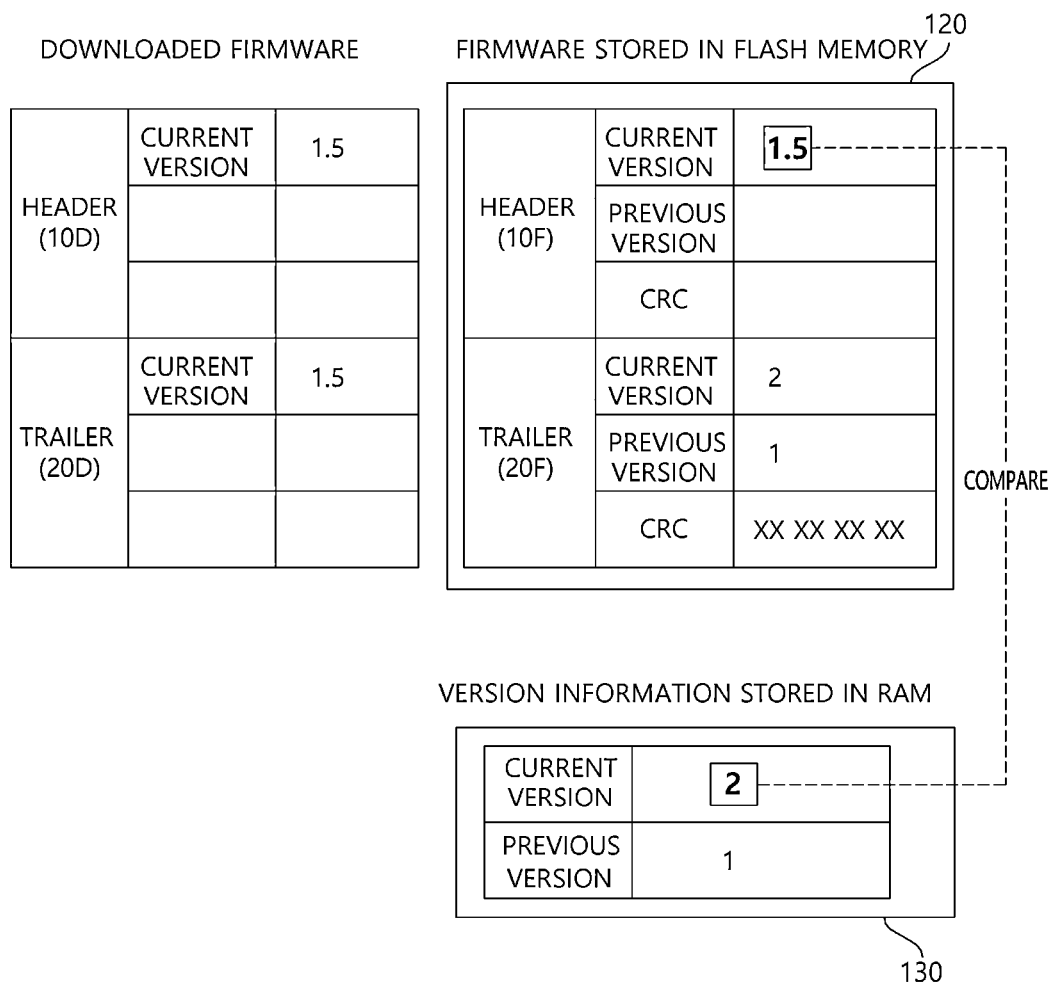

Referring to FIG. 9E, in step 435, a current version 1.5 of the new firmware included in the header block 10F of the flash memory 120 is compared with the current version 2 stored in the RAM 130. In this case, it is determined that the firmware is to be downgraded.

Figure 9F:
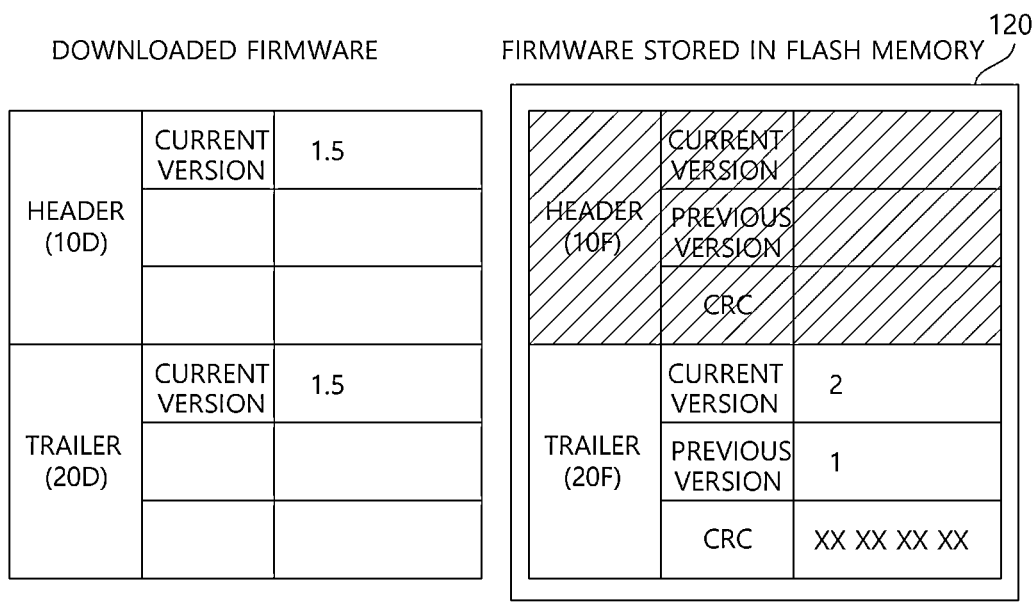
Figure 9F:
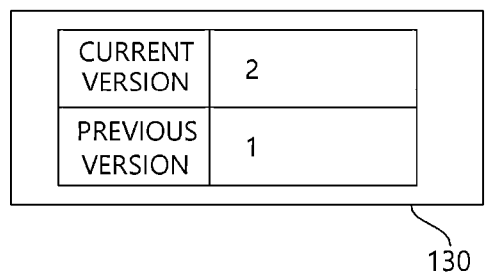

Referring to FIG. 9F, in step 475, a sector in which the header block 10F is located is erased from the flash memory 120 while maintaining the sector in which the trailer block 20F is located in the flash memory 120.

When the resetting is performed by step 478 in the state of FIG. 9F and then the firmware reprogramming is performed again, it is in a state of FIG. 6A so that as described above with reference to FIGS. 6A and 6B, the current version is recognized as 2. Therefore, the firmware reprogramming is successfully completed. As described above, according to an embodiment of the present disclosure, even though it is determined that the firmware is to be downgraded and the firmware is thus reset, the current version is correctly recognized by means of the trailer block 20F during the subsequent firmware reprogramming process to successfully complete the firmware reprogramming.

Next, referring to FIG. 4B, when the integrity verification of a new firmware to be downloaded fails in step 465, the method proceeds to step 470 at which a sector in which the trailer block is located is erased from the flash memory 120.

Next, in step 473, the trailer block is restored with the previous version information of the header block of the flash memory 120 as current version information.

In step 475, a sector of the flash memory 120 in which the trailer block is located is maintained in the flash memory 120 and a sector in which the header block is located is erased from the flash memory 120.

In step 478, a negative response code (NRC) is responded and the firmware is reset.

Figure 10A:
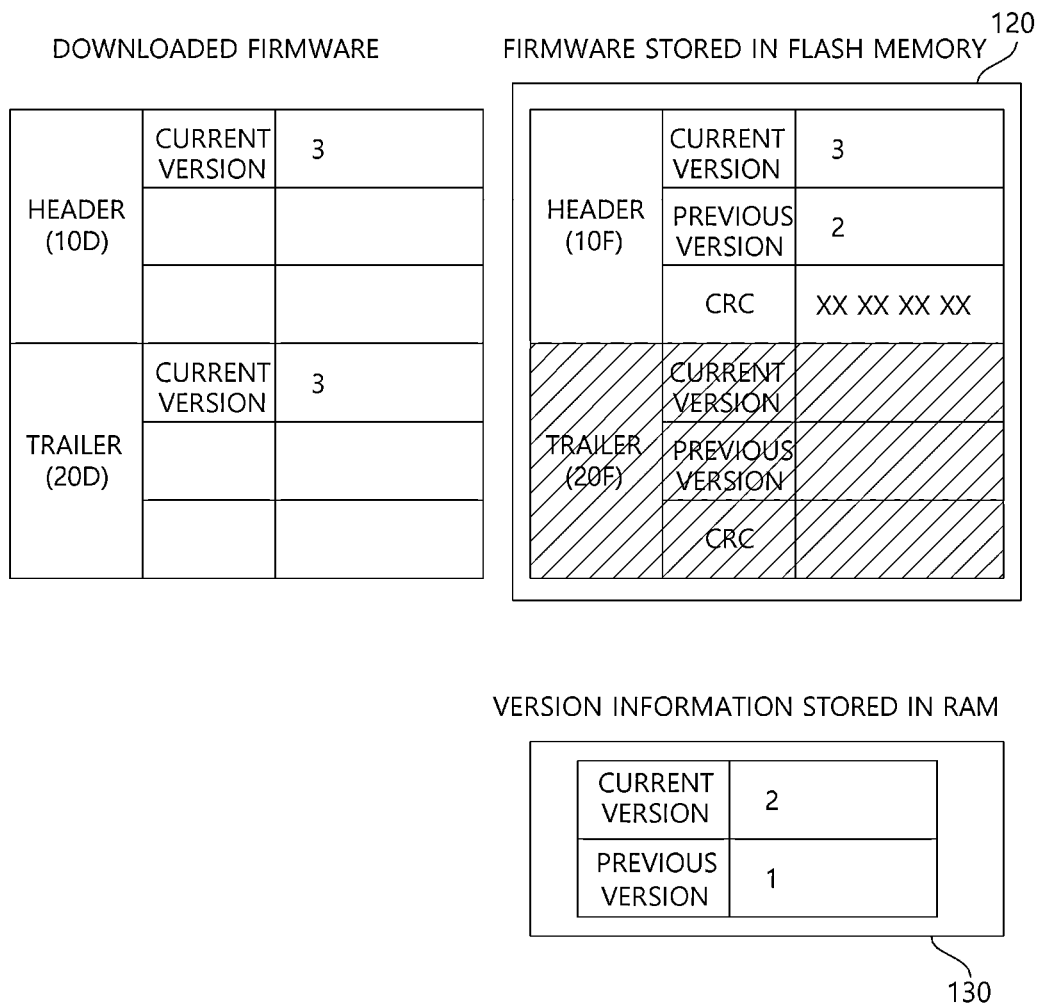
FIGS. 10A to 10C are views for explaining an example of a process of performing firmware reprogramming again after failure of integrity verification of a new firmware, according to an embodiment of the present disclosure.
Figure 10B:
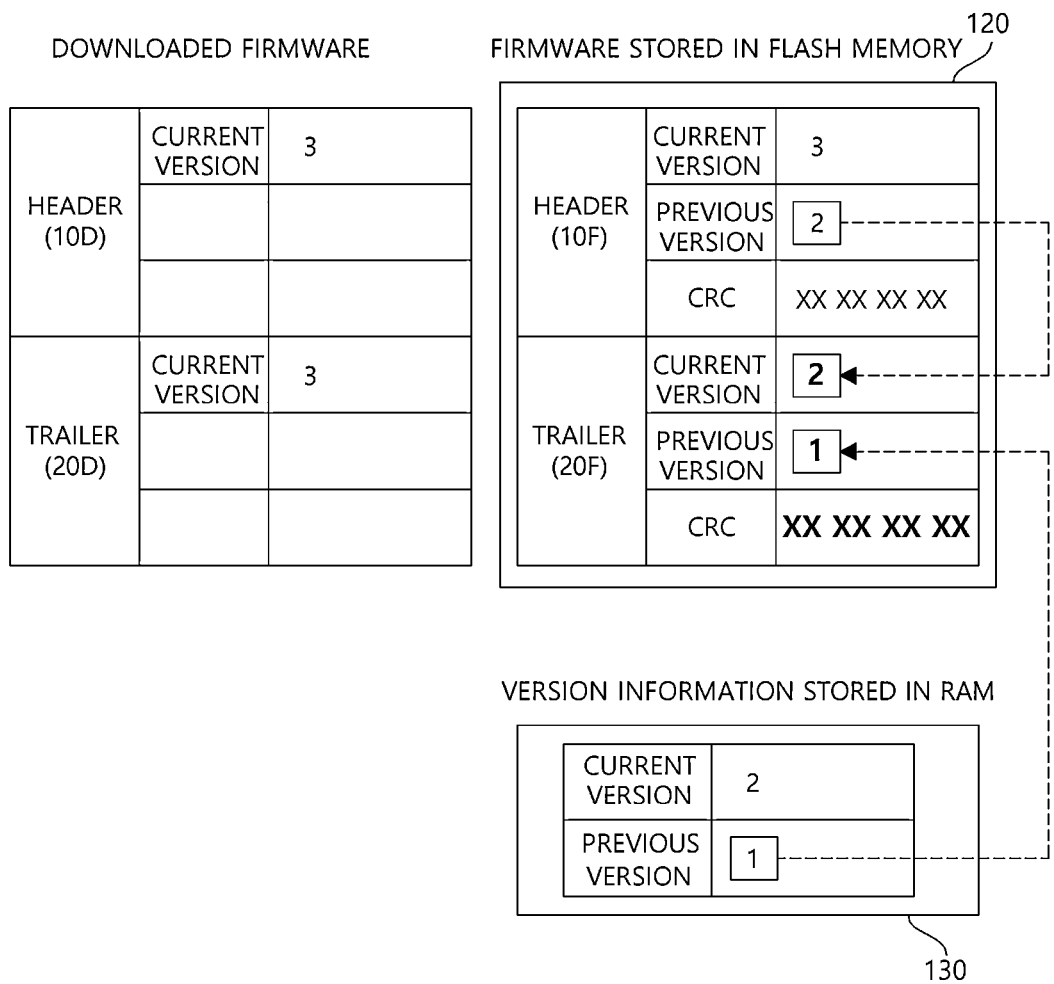
Figure 10C:
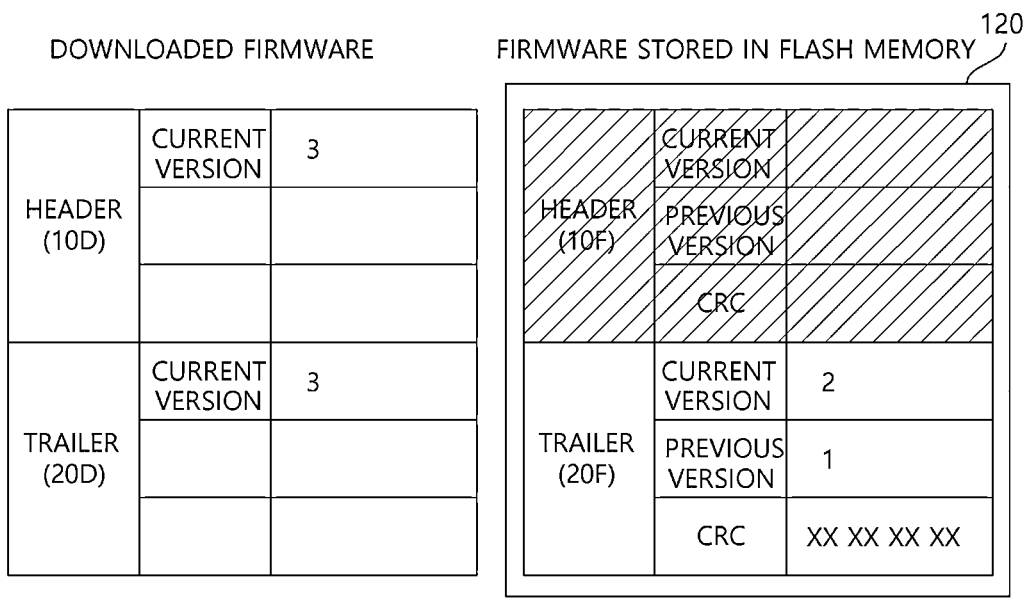

FIGS. 10A to 10C are views for explaining an example of a process of performing firmware reprogramming again after failure of integrity verification of a new firmware.

When the integrity verification of the new firmware fails in the state of FIG. 5I, as illustrated in FIG. 10A, a sector in which the trailer block 20F is located is erased from the flash memory 120 in step 470. In step 473, as illustrated in FIG. 10B, the previous version 2 of the header block 10F of the flash memory 120 becomes current version information of the trailer block 20F. The previous version of the trailer block 20F is recorded as the previous version 1 stored in the RAM 130 and CRC is generated based on the current version and the previous version of the trailer block 20F.

In step 475, as illustrated in FIG. 10C, a sector in which the header block 10F is located is erased from the flash memory 120 while maintaining the sector in which the trailer block 20F is located in the flash memory 120.

When the resetting is performed by step 478 in the state of FIG. 10C and then the firmware reprogramming is performed again, it is in a state of FIG. 6A so that as described above with reference to FIGS. 6A and 6B, the current version is recognized as 2. Therefore, the firmware reprogramming is successfully completed. As described above, according to an embodiment of the present disclosure, even though the integrity verification of the new firmware fails, the current version information of the trailer block 20F is restored using the previous version information of the header block 10F so that the current version is correctly recognized by the trailer block 20F during the subsequent firmware reprogramming, and the firmware reprogramming is successfully completed.

The combinations of blocks of the block diagrams and steps in the flowcharts of the present disclosure may be implemented by computer program instructions. The computer program instructions may be loaded in a processor of a general purpose computer, a special purpose computer, or other programmable data processing apparatus, so that the instructions executed via the processor of the computer or other programmable data processing apparatus create means for implementing the functions described in the blocks of the block diagrams or the steps in the flowcharts. These computer program instructions may also be stored in a computer-usable or computer-readable memory that may direct a computer or other programmable data processing apparatus to implement function in a particular manner, so that the instructions stored in the computer-usable or computer-readable memory produce a manufacturing article including instruction means which implement the function indicated in the blocks of the block diagrams or the steps in the flowcharts. The computer program instructions may be loaded onto a computer or other programmable data processing apparatus to cause a series of operational steps to be performed on the computer or other programmable data processing apparatus to produce a computer implemented process such that the instructions executed on the computer or other programmable data processing apparatus provide steps for implementing the functions described in the blocks of the block diagrams or the steps in the flowcharts.

Each block or each step may represent a part of a module, a segment or a code, including one or more executable instructions for executing specific logical function(s). In addition, it should be noted that the functions mentioned in the blocks or steps may occur out of order in several alternative embodiments. For example, two blocks or steps shown in succession may be executed substantially concurrently, or sometimes may be executed in reverse order according to corresponding functions.

As described above, embodiments have been described and illustrated in the drawings and the specification. The embodiments were chosen and described in order to explain certain principles of the disclosure and their practical application, to thereby enable others skilled in the art to make and utilize various embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A method of updating firmware by a flash bootloader, the method comprising:

storing current version information included in a trailer block of the firmware stored in a flash memory, wherein the firmware stored in the flash memory includes the trailer block and a header block;

erasing a first sector in which the header block is located while maintaining a second sector in which the trailer block is located in the flash memory;

writing a new header block of a new firmware to be downloaded in the first sector of the flash memory;

determining, by comparing current version information of the new firmware included in the new header block and the stored current version information, whether the firmware is to be downgraded; and in response to determining that the firmware is not to be downgraded, erasing the second sector in which the trailer block is located from the flash memory, and writing a new trailer block of the new firmware in the second sector of the flash memory.

2. The method of claim 1, further comprising, in response to determining that the firmware is not to be downgraded, adding the stored current version information to the new header block as previous version information.

3. The method of claim 2, further comprising adding a cyclic redundancy check (CRC) value to the new header block, wherein the CRC value is generated based on the current version information and the previous version information in the new header block.

4. The method of claim 2, further comprising:
verifying an integrity of the new firmware, and
adding the stored current version information to the new trailer block as previous version information if the integrity is verified.

5. The method according to claim 4, further comprising adding a cyclic redundancy check (CRC) value to the new trailer block, wherein the CRC value is generated based on current version information and the previous version information in the new trailer block.

6. The method of claim 4, further comprising:
erasing the second sector in which the new trailer block is located from the flash memory if the integrity is not verified,
restoring the trailer block with previous version information of the new header block stored in the flash memory as current version information, and
erasing the first sector in which the new header block is located while maintaining the second sector in which the trailer block is located in the flash memory.

7. The method of claim 1, further comprising, in response to determining that the firmware is to be downgraded, maintaining the second sector in which the trailer block is located in the flash memory and erasing the first sector in which the new header block is located.

8. The method of claim 1, further comprising:
confirming a validity of the header block of the firmware stored in the flash memory, and
confirming a validity of the trailer block of the firmware stored in the flash memory.

9. The method of claim 8, wherein:
confirming the validity of the header block is performed using i) current version information and previous version information included in the header block and ii) a cyclic redundancy check (CRC) generated based on the current version information and the previous version information included in the header block, and
confirming the validity of the trailer block is performed using i) current version information and previous version information included in the trailer block and ii) a cyclic redundancy check (CRC) generated based on the current version information and the previous version information included in the trailer block.

10. The method of claim 8, further comprising, when i) it is confirmed that the header block is valid and ii) it is confirmed that the trailer block is not valid:
erasing the second sector in which the trailer block is located from the flash memory before storing the current version information included in the trailer block of the firmware stored in the flash memory, and
restoring the trailer block with previous version information of the header block stored in the flash memory as current version information.

11. The method of claim 1, wherein storing the current version information included in the trailer block of the firmware stored in the flash memory comprises storing the current version information in a random-access memory (RAM).

12. The method of claim 1, wherein the header block and the trailer block are configured to be located in different sectors of the flash memory.

* * * * *